United States Patent
Suzuki

(10) Patent No.: US 12,219,084 B2
(45) Date of Patent: Feb. 4, 2025

(54) COMMUNICATION APPARATUS, INFORMATION PROCESSING APPARATUS, AND INFORMATION PROCESSING METHOD TO FEED BACK PRESENCE OF A WIRELESS SIGNAL

(71) Applicant: SONY GROUP CORPORATION, Tokyo (JP)

(72) Inventor: Yuichiro Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 584 days.

(21) Appl. No.: 17/425,003

(22) PCT Filed: Jan. 31, 2019

(86) PCT No.: PCT/JP2019/003449
§ 371 (c)(1),
(2) Date: Jul. 22, 2021

(87) PCT Pub. No.: WO2020/157930
PCT Pub. Date: Aug. 6, 2020

(65) Prior Publication Data
US 2022/0094775 A1    Mar. 24, 2022

(51) Int. Cl.
*H04M 1/72454*   (2021.01)
*G06T 19/00*   (2011.01)
(Continued)

(52) U.S. Cl.
CPC ....... *H04M 1/72454* (2021.01); *G06T 19/006* (2013.01); *H01Q 1/243* (2013.01);
(Continued)

(58) Field of Classification Search
CPC ............. G06T 19/006; H04M 1/72454; H04B 17/318; H04B 7/088; H01Q 1/243
See application file for complete search history.

(56) References Cited

U.S. PATENT DOCUMENTS

| 2013/0189929 A1 | 7/2013 | Takahashi et al. |
| 2014/0349715 A1 | 11/2014 | Sasaki et al. |
| 2016/0278044 A1* | 9/2016 | Nishioka ............... H04W 16/28 |

FOREIGN PATENT DOCUMENTS

| EP | 2747193 A1 | 6/2014 |
| EP | 2785023 A1 | 10/2014 |

(Continued)

OTHER PUBLICATIONS

Machine Translation of WO2017/169013 (Year: 2017).*

(Continued)

*Primary Examiner* — King Y Poon
*Assistant Examiner* — Vincent Peren

(57) ABSTRACT

An information processing apparatus including a communication apparatus includes one or more communication sections, an estimation section, and an output control section is provided. The one or more communication sections each communicate with other communication apparatuses via a wireless communication channel. The estimation section estimates, on the basis of reception results of a wireless signal by at least some of the one or more communication sections, an incoming direction of the wireless signal. The output control section exercises control in such a manner that notification information according to an estimation result of the incoming direction is presented via an output section.

13 Claims, 15 Drawing Sheets

(51) Int. Cl.
*H01Q 1/24* (2006.01)
*H04B 7/08* (2006.01)
*H04B 17/318* (2015.01)

(52) U.S. Cl.
CPC .......... *H04B 7/088* (2013.01); *H04B 17/318* (2015.01); *H04M 2250/52* (2013.01)

(56) References Cited

FOREIGN PATENT DOCUMENTS

| | | | |
|---|---|---|---|
| JP | 2012-078172 | A | 4/2012 |
| JP | 2012-248935 | A | 12/2012 |
| JP | 2014-239393 | A | 12/2014 |
| JP | 5647595 | B2 | 1/2015 |
| JP | 2016-092451 | A | 5/2016 |
| JP | 6059607 | B2 | 1/2017 |
| JP | 6584034 | B2 | 10/2019 |
| KR | 10-2000-0042765 | A | 7/2000 |
| WO | 2012/042851 | A1 | 4/2012 |
| WO | 2013/077197 | A1 | 5/2013 |
| WO | 2017/169010 | A1 | 10/2017 |
| WO | 2017/169013 | A1 | 10/2017 |
| WO | 2017/169016 | A1 | 10/2017 |
| WO | WO2017/169013 | * | 10/2017 ............ H04M 1/247 |
| WO | WO2017/169016 | * | 10/2017 ............ H04M 1/00 |
| WO | 2018/143390 | A1 | 8/2018 |

OTHER PUBLICATIONS

Machine Translation of WO2017/169016 (Year: 2017).*
International Search Report and Written Opinion of PCT Application No. PCT/JP2019/003449, issued on Mar. 26, 2019, 08 pages of ISRWO.
European Search Report of EP Application No. 19912397.7, issued on Jan. 4, 2022, 07 pages.

* cited by examiner

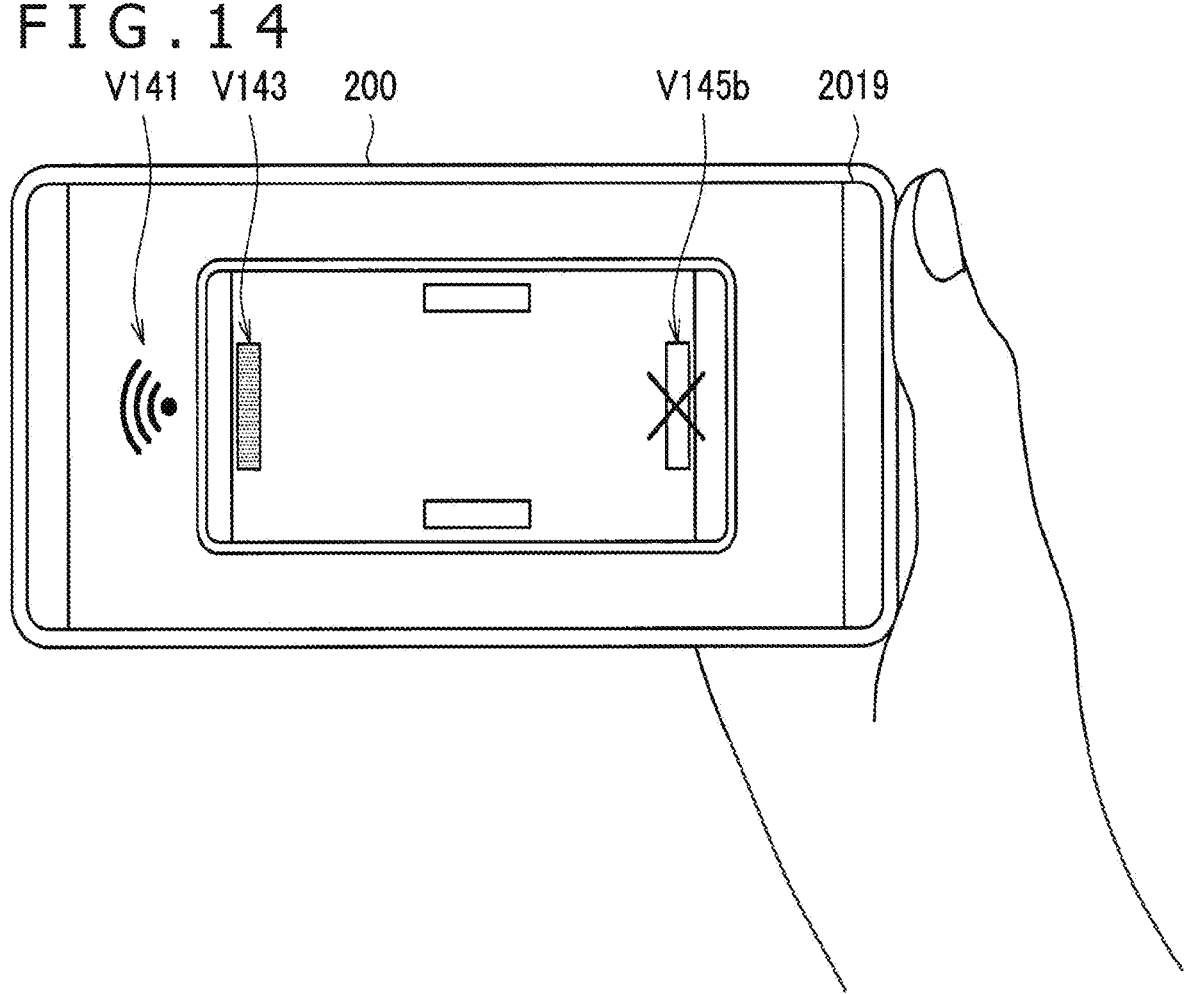

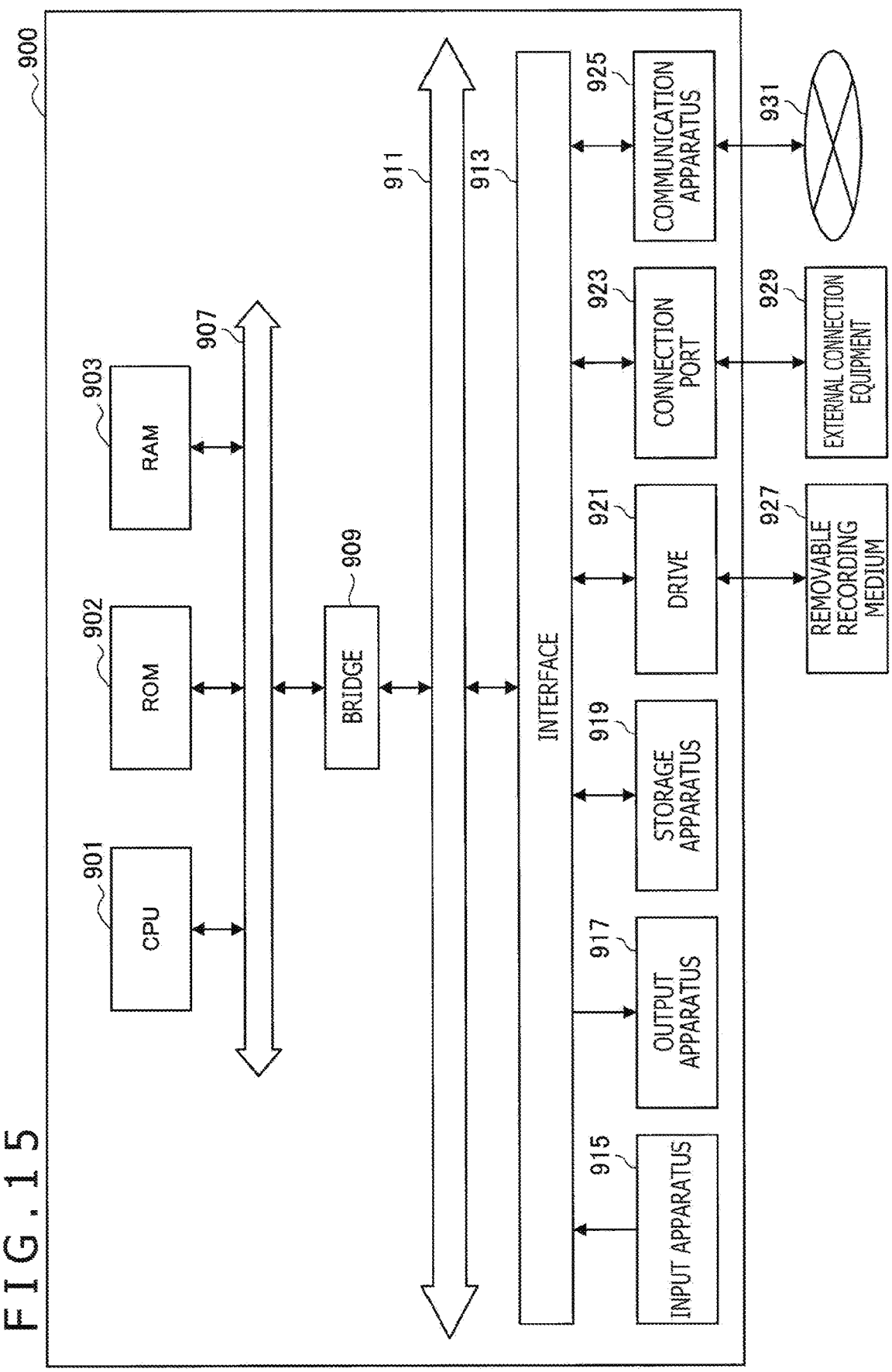

COMMUNICATION APPARATUS, INFORMATION PROCESSING APPARATUS, AND INFORMATION PROCESSING METHOD TO FEED BACK PRESENCE OF A WIRELESS SIGNAL

CROSS REFERENCE TO RELATED APPLICATIONS

This application is a U.S. National Phase of International Patent Application No. PCT/JP2019/003449 filed on Jan. 31, 2019. Each of the above-referenced applications is hereby incorporated herein by reference in its entirety.

TECHNICAL FIELD

The present disclosure relates to a communication apparatus, an information processing apparatus, and an information processing method.

BACKGROUND ART

In mobile communication systems based on a communication standard referred to as LTE/LTE-A (Advanced), wireless signals at frequencies ranging approximately from 700 MHz to 3.5 GHz that are referred to as ultra high frequencies are primarily used for communication.

Also, recent years have seen various examinations conducted regarding a fifth generation (5G) mobile communication system, which is a next step after LTE/LTE-A. In the fifth generation (5G) mobile communication system, for example, use of communication using the wireless signals at frequencies of 28 GHz and 39 GHz that are called millimeter waves (hereinafter also simply referred to as "millimeter waves") is under examination. In NPL 1, for example, the use of millimeter waves for mobile communication systems is under examination. Also, a communication standard referred to as WiGig (registered trademark) using a 60 GHz band can be cited as a specific example of a communication standard using millimeter waves.

In general, millimeter waves attenuate relatively significantly in space, and high-gain antennas tend to be required in a case where millimeter waves are used for communication. In order to meet such a demand, a technology referred to as what is called beam forming is used in some cases. Specifically, it becomes possible to improve an antenna gain by controlling an antenna beam width through the beam forming and improving a beam directivity.

CITATION LIST

Non Patent Literature

[NPL 1]
  Samsung, SK Telecom, KT Corporation, LG Uplus, NTT DOCOMO, INC., "On band definition for 26.5-29.5 GHz," R4-1704770, 3GPP TSG RAN WG4 Meeting #83, Hangzhou, China 15-19 May 2017

SUMMARY

Technical Problem

Meanwhile, millimeter waves have an extremely high straight traveling property, and if the millimeter waves are shielded by a building, a human, a vehicle, or other shields, a situation where it is temporarily difficult to acquire a sufficient radio wave strength may be assumed to arise. In such a situation, for example, as a result of a change in position or posture of a terminal apparatus caused by a movement of the user or the like, it becomes possible for the terminal apparatus, in some cases, to receive a direct wave of the wireless signal transmitted from a base station again (i.e., becomes possible to acquire a sufficient radio wave strength). However, it is difficult for the user to directly view the wireless signal. Against such a backdrop, there is a demand for a technology that feeds back presence of the wireless signal to the user.

Accordingly, the present disclosure proposes a technology that makes it possible to feed back the presence of the wireless signal in a more preferred manner.

Solution to Problem

According to the present disclosure, there is provided a communication apparatus that includes one or more communication sections each configured to communicate with other communication apparatuses via a wireless communication channel, an estimation section configured to estimate, on the basis of reception results of a wireless signal by at least some of the one or more communication sections, an incoming direction of the wireless signal, and an output control section configured to exercise control in such a manner that notification information according to an estimation result of the incoming direction is presented via an output section.

Also, according to the present disclosure, there is provided an information processing apparatus that includes an estimation section configured to estimate, on the basis of reception results of a wireless signal by at least some of one or more communication sections each of which communicates with other communication apparatuses via a wireless communication channel, an incoming direction of the wireless signal in question, and an output control section configured to exercise control in such a manner that notification information according to an estimation result of the incoming direction is presented via an output section.

Also, according to the present disclosure, there is provided an information processing method that includes, by a computer, estimating, on the basis of reception results of a wireless signal by at least some of one or more communication sections each of which communicates with other communication apparatuses via a wireless communication channel, an incoming direction of the wireless signal in question, and exercising control in such a manner that notification information according to an estimation result of the incoming direction is presented via an output section.

BRIEF DESCRIPTION OF DRAWINGS

FIG. 14 is an explanatory diagram for outlining an example of an operation related to guidance given regarding a method by which a housing is to be gripped by the communication apparatus according to working example 6.

FIG. 15 is a functional block diagram illustrating an example of a hardware configuration of an information processing apparatus included in the system according to the embodiment.

DESCRIPTION OF EMBODIMENT

A detailed description will be given below of a preferred embodiment of the present disclosure with reference to attached drawings. It should be noted that redundant description will be avoided by denoting constituent elements having substantially the same functional configuration by the same reference sign in the present specification and drawings.

Figure 1:
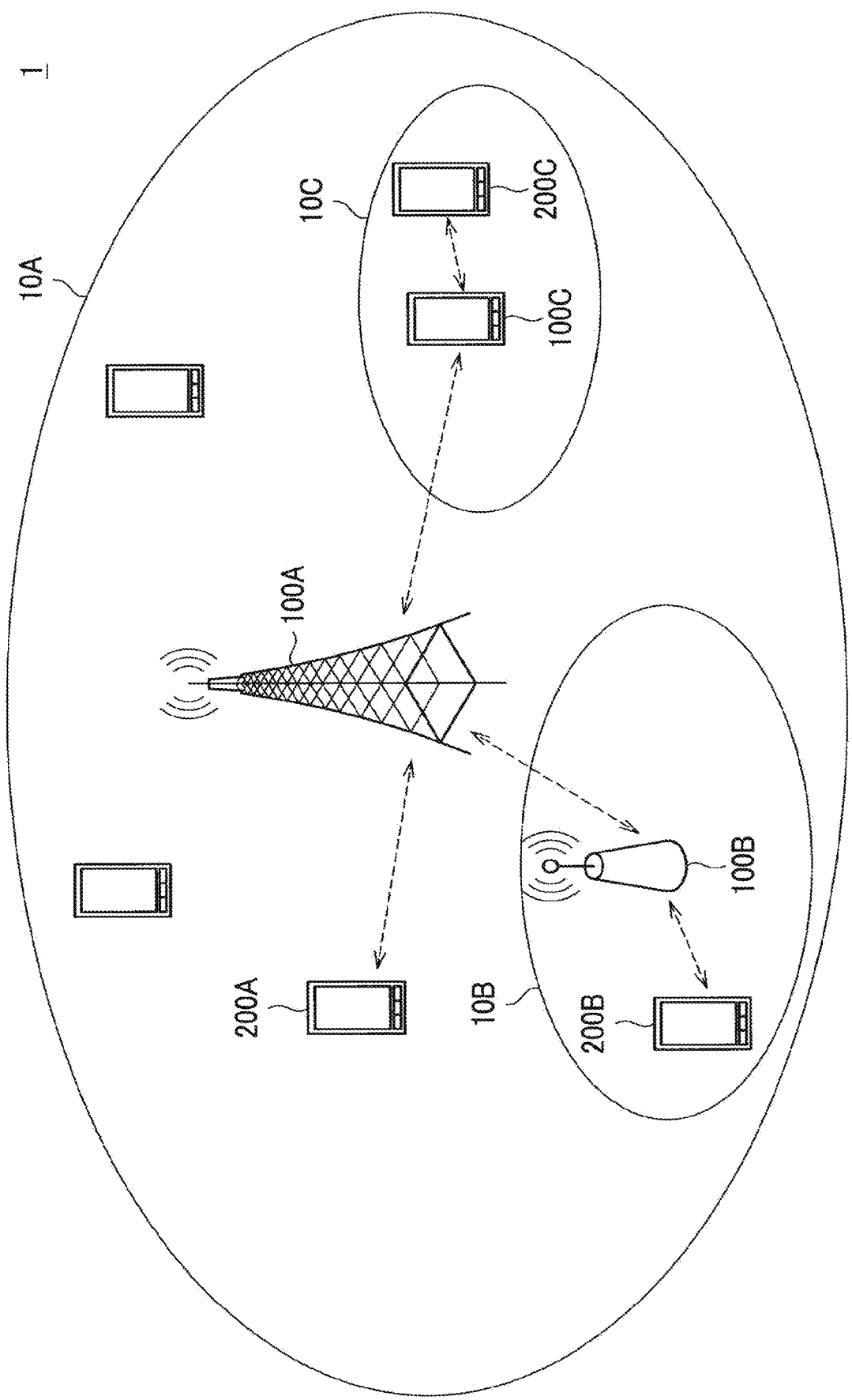
FIG. 1 is an explanatory diagram for describing an example of a schematic configuration of a system according to an embodiment of the present disclosure.

It should be noted that the description will be given in the following order.
1. Schematic configuration
   1.1. Example of the system configuration
   1.2. Configuration example of the terminal apparatus
2. Examination regarding communication assuming the use of millimeter waves
3. Technical features
   3.1. Schematic configuration of the communication apparatus
   3.2. Schematic operation
   3.3. Working examples
4. Hardware configuration
5. Conclusion 1. Schematic Configuration 1.1. Example of the System Configuration A description will be given first of an example of a schematic configuration of a system 1 according to an embodiment of the present disclosure. FIG. 1 is an explanatory diagram for describing the example of the schematic configuration of the system 1 according to the embodiment of the present disclosure. As illustrated in FIG. 1, the system 1 includes wireless communication apparatuses 100 and terminal apparatuses 200. Here, the terminal apparatuses 200 are also referred to as users. The users in question are also referred to as UEs. A wireless communication apparatus 100C is also referred to as a UE-Relay. Here, the UEs may be UEs defined in LTE or LTE-A, and the UE-Relay may be a Prose UE to Network Relay discussed in 3GPP or may, more commonly, mean communication equipment.

(1) Wireless Communication Apparatuses 100

The wireless communication apparatuses 100 provide a wireless communication service to subordinate apparatuses. For example, a wireless communication apparatus 100A is a base station of a cellular system (or mobile communication system). The base station 100A conducts communication with an apparatus (e.g., terminal apparatus 200A) located inside a cell 10A of the base station 100A. For example, the base station 100A transmits a downlink signal to the terminal apparatus 200A and receives an uplink signal from the terminal apparatus 200A.

The base station 100A is logically connected to another base station, for example, by an X2 interface, and can transmit and receive control information and the like. Also, the base station 100A is logically connected to what is called a core network (not illustrated), for example, by an Si interface, and can transmit and receive control information and the like. It should be noted that communication between these apparatuses can be physically relayed by a variety of apparatuses.

Here, the wireless communication apparatus 100A illustrated in FIG. 1 is a macrocell base station, and the cell 10A is a macrocell. Meanwhile, wireless communication apparatuses 100B and 100C are master devices that operate small cells 10B and 10C, respectively. As an example, the master device 100B is a small cell base station that is installed in a stationary manner. The small cell base station 100B establishes a wireless backhaul link with the macrocell base station 100A and an access link with each of one or more terminal apparatuses (e.g., terminal apparatus 200B) inside the small cell 10B. It should be noted that the wireless communication apparatus 100B may be a relay node defined in 3GPP. The master device 100C is a dynamic AP (access point). The dynamic AP 100C is a mobile device that dynamically operates the small cell 10C. The dynamic AP 100C establishes a wireless backhaul link with the macrocell base station 100A and an access link with each of one or more terminal apparatuses (e.g., terminal apparatus 200C) inside the small cell 10C. The dynamic AP 100C may be a terminal apparatus equipped with hardware or software capable of operating as a base station or a wireless access point. In this case, the small cell 10C is a dynamically formed local network (Localized Network/Virtual Cell).

The cell 10A may be operated according to any wireless communication scheme such as NR, LTE, LTE-A (LTE-Advanced), LTE-ADVANCED PRO, GSM (registered trademark), a UMTS, W-CDMA, CDMA200, WiMAX, WiMAX2, or IEEE802.16.

It should be noted that a small cell is a concept that can include a variety of types of cells that are smaller than a macrocell and disposed in an overlapping manner or not in an overlapping manner (e.g., femtocell, nanocell, picocell, and microcell). In an example, the small cell is operated by a dedicated base station. In another example, the small cell is operated as a result of a temporary operation of a terminal, which is a master device, as the small cell base station. What is called a relay node can be also considered a mode of the small cell base station. The wireless communication apparatus that functions as a master station of the relay node is also referred to as a donor base station. The donor base station may mean a DeNB in LTE and, more commonly, the master station of the relay node.

(2) Terminal Apparatus 200

The terminal apparatus 200 can communicate in a cellular system (or mobile communication system). The terminal apparatus 200 wirelessly communicates with a wireless communication apparatus of a cellular system (e.g., the base station 100A, the master device 100B, or the master device 100C). For example, the terminal apparatus 200A receives the downlink signal from the base station 100A and transmits the uplink signal to the base station 100A.

Also, as the terminal apparatus 200, not only what is called the UE but also what is called low-cost terminals (Low cost UEs) such as an MTC terminal, an eMTC (Enhanced MTC) terminal, and an NB-IoT terminal may be applied.

(3) Supplement

Although the schematic configuration of the system 1 has been described above, the present technology is not limited to the example illustrated in FIG. 1. For example, the configuration not including the master device, an SCE (Small Cell Enhancement), HetNet (Heterogeneous Network), an MTC network, and the like can be adopted as the configuration of the system 1. Also, as another example of the configuration of the system 1, the master device may be connected to the small cell so that the cell is built under the small cell.

An example of the schematic configuration of the system 1 according to the embodiment of the present disclosure has been described above with reference to FIG. 1.

1.2. Configuration Example of the Terminal Apparatus

Figure 2:
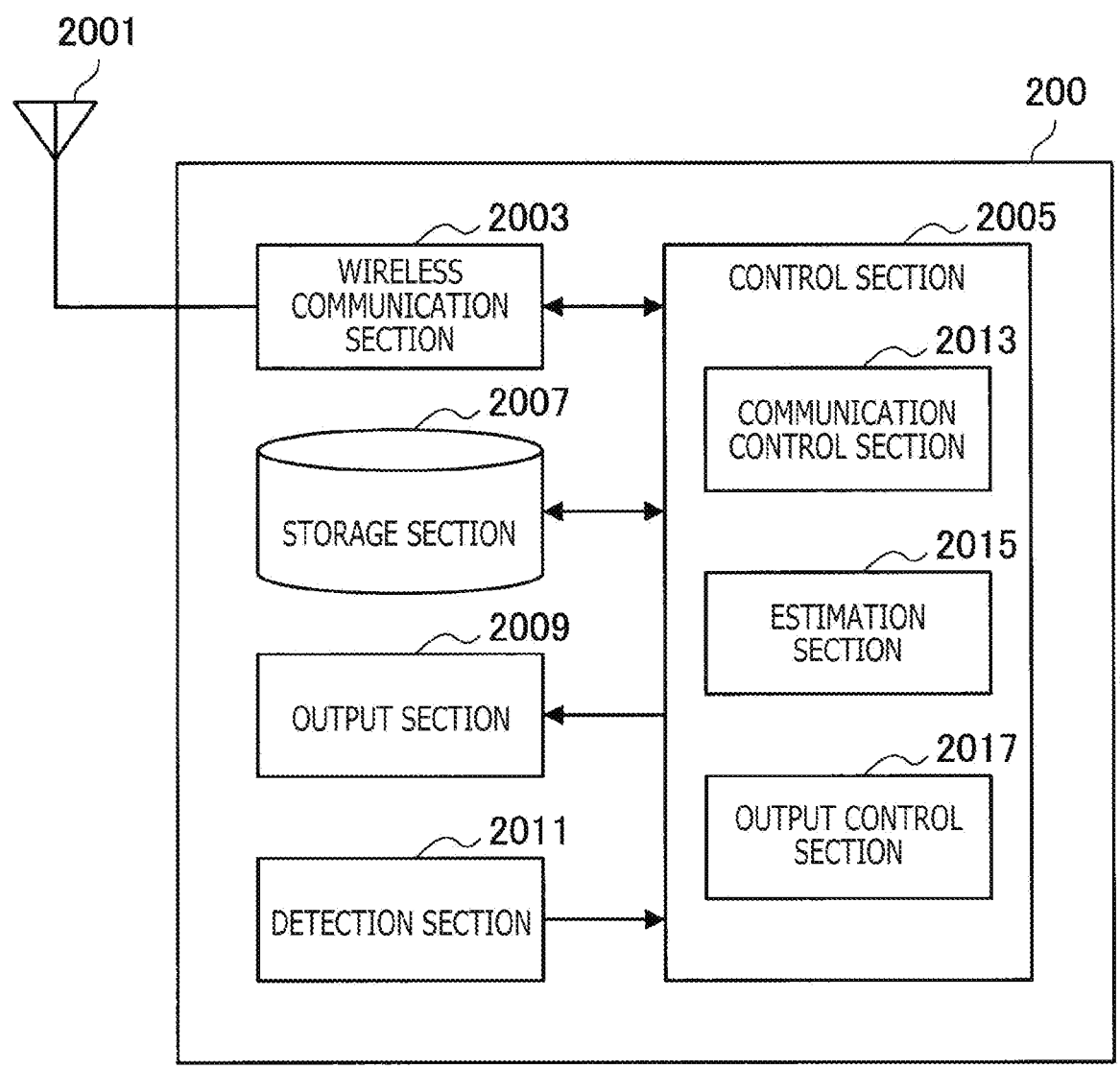
FIG. 2 is a block diagram illustrating an example of a configuration of a terminal apparatus according to the embodiment.

A description will be given next of an example of the configuration of the terminal apparatus 200 according to the embodiment of the present disclosure with reference to FIG. 2. FIG. 2 is a block diagram illustrating an example of the configuration of the terminal apparatus 200 according to the embodiment of the present disclosure. As illustrated in FIG. 2, the terminal apparatus 200 includes an antenna section 2001, a wireless communication section 2003, a storage section 2007, an output section 2009, a detection section 2011, and a control section 2005.

(1) Antenna Section 2001

The antenna section 2001 radiates a signal, which is output from the wireless communication section 2003, into space as a radio wave. Also, the antenna section 2001 converts the radio wave in space into the signal and outputs the signal in question to the wireless communication section 2003.

(2) Wireless Communication Section 2003

The wireless communication section 2003 transmits and receives the signals. For example, the wireless communication section 2003 receives the downlink signal from the base station and transmits the uplink signal to the base station.

(3) Storage Section 2007

The storage section 2007 temporarily or permanently stores a program and a variety of pieces of data for operating the terminal apparatus 200.

(4) Output Section 2009

The output section 2009 presents various types of information to the user. The configuration of the output section 2009 may be changed as appropriate according to the method by which information to be presented is presented, and a plurality of types of devices may be applied as the output section 2009 in question. As a specific example, the output section 2009 may be configured as a display section such as what is called a display. In this case, the output section 2009 presents various types of information to the user by displaying display information such as an image (e.g., video or still image). Also, as another example, the output section 2009 may be configured as an acoustic output section such as what is called a speaker. In this case, the output section 2009 presents various types of information to the user by outputting acoustics such as voice. Also, the output section 2009 may include a vibration section such as an actuator, simulate a tactile sensation and a force sensation by vibrating the vibration section in question, and present various types of information to the user through presentation of the tactile sensation and the force sensation in question. Naturally, these are merely examples and do not necessarily limit the types of information to be presented, the method by which the information in question is presented, and the configuration of the output section 2009 involved in the presentation of the information in question.

(5) Detection Section 2011

The detection section 2011 detects various states of the terminal apparatus 200. As a specific example, the detection section 2011 may include various sensors such as an acceleration sensor and an angular velocity sensor and detect a change in posture of a housing of the terminal apparatus 200, a change in position of the terminal apparatus 200, and the like.

(6) Control Section 2005

The control section 2005 provides a variety of functions of the terminal apparatus 200. The control section 2005 includes a communication control section 2013, an estimation section 2015, and an output control section 2017. It should be noted that the control section 2005 can further include other constituent elements other than these constituent elements. That is, the control section 2005 can conduct another operation other than that of these constituent elements.

The communication control section 2013 controls communication with another apparatus (e.g., base station 100) by controlling the operation of the wireless communication section 2003. As a specific example, the communication control section 2013 may generate a transmission signal by modulating the data to be transmitted on the basis of a predetermined modulation scheme and cause the communication section 2003 to transmit the transmission signal in question to the base station 100. Also, as another example, the communication control section 2013 may acquire, from the wireless communication section 2003, a signal reception result (i.e., reception signal) from the base station 100 and demodulate the data transmitted from the base station 100 in question by subjecting the reception signal to a predetermined demodulation process.

The estimation section 2015 estimates, on the basis of the reception result of the wireless signal transmitted from another communication apparatus (e.g., base station 100), an incoming direction of the wireless signal in question. At this time, the estimation section 2015 may use a detection result of the posture (posture of the housing) of the terminal apparatus 200 by the detection section 2011 to estimate the incoming direction of the wireless signal. It should be noted that the method by which the incoming direction of the wireless signal is estimated will be described later in detail separately.

The output control section 2017 controls the presentation of information via the output section 2009. As a specific example, the output control section 2017 may cause the output section 2009 to present various types of information according to a result of control over communication by the communication control section 2013. Also, the output control section 2017 may cause the output section 2009 to present various types of information according to an estimation result of the incoming direction of the wireless signal by the estimation section 2015. As a specific example, the output control section 2017 may present, to the user, display information presented in a manner that permits identification of the incoming direction of the wireless signal to the terminal apparatus 200 via the output section 2009 that is configured as a display section such as a display. Also, at this time, the output control section 2017 may control information to be presented via the output section 2009 according to the detection result of the posture (posture of the housing) of the terminal apparatus 200 by the detection section 2011. It should be noted that the processes related to the presentation of information according to the estimation result of the incoming direction of the wireless signal will be described later in detail separately.

It should be noted that the configuration illustrated in FIG. 2 is merely an example and does not necessarily limit the functional configuration of the terminal apparatus 200 according to the present embodiment. As a specific example, some of constituents of the terminal apparatus 200 may be provided outside the terminal apparatus 200 in question. As a more specific example, a portion equivalent to the wireless communication section 2003 may be externally attached to the terminal apparatus 200 as an external apparatus. Also, as another example, a constituent equivalent to the control section 2005 or a constituent equivalent to part of the control section 2005 may be configured as an external apparatus such as a chip, and a function thereof may be realized as a result of the attachment to the terminal apparatus 200. As described above, the wireless communication section 2003 and the control section 2005 may be provided in different apparatuses, and in this case, an apparatus having the control section 2005 is equivalent to an example of an "information processing apparatus." Also, some of the constituents of the control section 2005 may be provided outside the terminal apparatus 200. As a specific example, a constituent equivalent to the estimation section 2015 may be provided in other apparatus, and in this case, an apparatus having the constituent equivalent to the estimation section 2015 is equivalent to an example of the "information processing apparatus." Also, of the constituents of the terminal apparatus 200, at least some of the constituents may be realized as a result of the coordinated operation of a plurality of devices.

An example of the configuration of the terminal apparatus 200 according to the embodiment of the present disclosure has been described above with reference to FIG. 2.

2. Examination Regarding Communication Assuming the Use of Millimeter Waves

In the communication system based on a standard such as LTE/LTE-A, the wireless signals at frequencies ranging approximately from 700 MHz to 3.5 GHz that are referred to as ultra high frequencies are used for communication. In contrast, in the fifth generation (5G) mobile communication system, which is the next step after LTE/LTE-A, the use of communication using the wireless signals at the frequencies such as 28 GHz and 39 GHz that are referred to as millimeter waves (hereinafter also simply referred to as "millimeter waves") is under examination.

In communication using the ultra high frequencies such as LTE/LTE-A, adoption of a technology referred to as what is called MIMO (Multiple-Input and Multiple-Output) makes possible to improve communication performance even under a fading environment by using not only direct waves but also reflected waves for signal transmission and reception.

In contrast, while the millimeter waves can increase an amount of information to be transmitted as compared to the ultra high frequencies, the millimeter waves have the high straight traveling property, resulting in a tendency for greater propagation loss and reflection loss. Accordingly, in an environment where no obstacles are present on a route directly connecting antennas that transmit and receive the wireless signals (what is called an LOS: Line of Site), the direct waves primarily contribute to communication characteristics with almost no impact of reflected waves. Due to such characteristics, it becomes possible for communication terminals such as smartphones to improve their communication performance by receiving the wireless signals (i.e., millimeter waves) transmitted directly from the base stations (i.e., by receiving the direct waves) in communication using the millimeter waves.

Also, as described above, the millimeter waves are subject to relatively high propagation loss (spatial attenuation). Accordingly, high-gain antennas tend to be required in a case where the millimeter waves are used for communication. In order to meet such a demand, the use of a directional beam is under examination for communication between the base station and a terminal apparatus in a 5G mobile communication system by forming the directional beam by using a technology referred to as what is called beam forming. By using such a technology, it becomes possible to multiplex communication between the base station and the terminal apparatus not only in time and frequency but also in space.

Meanwhile, because of an extremely high straight traveling property of the millimeter waves, if the millimeter waves are shielded by a building, a human, a vehicle, or other shields, the situation where it is temporarily difficult to acquire the sufficient radio wave strength may be assumed to arise. In such a situation, for example, as a result of a change in position or posture of the terminal apparatus caused by a movement of the user or the like, it becomes possible for the terminal apparatus, in some cases, to receive the direct wave of the wireless signal transmitted from the base station again (i.e., becomes possible to acquire the sufficient radio wave strength). However, needless to say, it is difficult for the user to directly view the wireless signal. Against such a backdrop, there is a demand for a technology that feeds back the presence of the wireless signal to the user.

In consideration of such a situation, the present disclosure proposes a technology that, in the situation where the wireless signal such as millimeter wave that has the extremely high straight traveling property and can decline significantly in radio wave strength as a result of being shielded by the shield is used, makes it possible to feed back, to the user, the presence of the wireless signal in a more preferred manner.

3. Technical Features

A description will be given next of technical features of the communication apparatus (terminal apparatus 200) according to the embodiment of the present disclosure.

3.1. Schematic Configuration of the Communication Apparatus

A description will be given first of an example of the configuration of the terminal apparatus 200 that assumes the use of the millimeter waves in particular as an example of the schematic configuration of the communication apparatus according to the embodiment of the present disclosure. For example, FIG. 3 is an explanatory diagram for describing an example of the schematic configuration of the communication apparatus that assumes the use of the millimeter waves and illustrates, in particular, an example of a method by which an antenna apparatus (communication section) that transmits and receives the wireless signals is installed.

Figure 3:
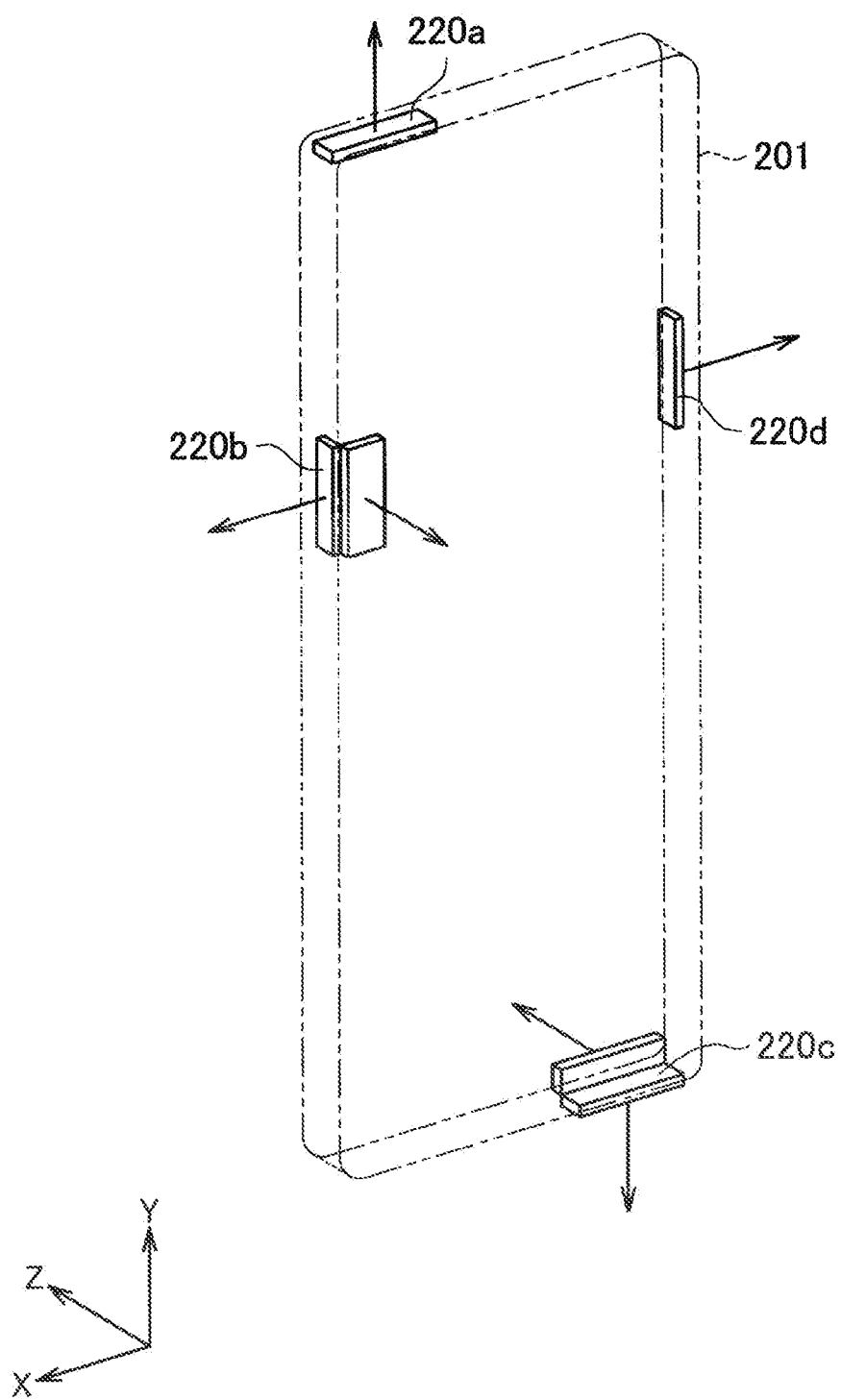
FIG. 3 is an explanatory diagram for describing an example of a schematic configuration of a communication apparatus that assumes the use of millimeter waves.

In the example illustrated in FIG. 3, the terminal apparatus 200 includes a plate-shaped housing 201 having approximately rectangular front and rear surfaces. It should be noted that, in the description given below, a thickness direction of the plate-shaped housing 201 is denoted as a z direction and that, in particular, a front surface side where the display section such as a display is provided is also referred to as a positive z direction and a rear surface side is also referred to as a negative z direction for reasons of convenience. Also, a long length direction of the front surface of the plate-shaped housing 201 is denoted as a y direction, and, in a case where the terminal apparatus 200 is used in a state of being held in a vertical orientation in particular, the direction equivalent to an upper side as seen from the user is also denoted as a positive y direction, and the direction equivalent to a lower side is also denoted as a negative y direction. Also, a short length direction of the front surface of the plate-shaped housing 201 is denoted as an x direction, and, in a case where the terminal apparatus 200 is used in a state of being held in the vertical orientation in particular, the direction equivalent to a right side as seen from the user is also denoted as a positive x direction, and the direction equivalent to a left side is also denoted as a negative x direction.

The terminal apparatus 200 illustrated in FIG. 3 includes a plurality of antenna apparatuses 220 as communication sections for transmitting and receiving the wireless signals (i.e., antenna apparatuses 220*a* to 220*d*). Each of the antenna apparatuses 220*a* to 220*d* is supported by a housing 201 of the terminal apparatus 200 in such a manner as to be able to receive the wireless signals arriving from different directions relative to the housing 201 in question. At this time, each of the antenna apparatuses 220*a* to 220*d* is held inside the housing 201 in question, for example, in such a manner as to be located in the vicinity of an edge portion of the housing 201.

As a specific example, the antenna apparatus 220*a* is held in the vicinity of the edge portion of the housing 201 in the positive y direction relative to the terminal apparatus 200 in such a manner as to be able to receive the wireless signals arriving from the positive y direction. Also, the antenna apparatus 220*d* is held in the vicinity of the edge portion of the housing 201 in the negative x direction relative to the terminal apparatus 200 in such a manner as to be able to receive the wireless signals arriving from the negative x direction.

Also, some of the antenna apparatuses 220 (communication sections) may be configured in such a manner as to be able to receive the wireless signals arriving from the plurality of directions by including a plurality of communication modules. As a specific example, the antenna apparatus 220*b* includes two communication modules that are connected in the shape of a letter "L." On the basis of such a configuration, the antenna apparatus 220*b* is held in the vicinity of the edge portion of the housing 201 in the positive x direction relative to the terminal apparatus 200 in such a manner as to allow one of the modules to receive the wireless signals arriving from the positive x direction. Also, at this time, the antenna apparatus 220*b* is held in the vicinity of the surface of the housing 201 in the negative z direction relative to the terminal apparatus 200 (rear surface) in such a manner as to allow the other module to receive the wireless signals arriving from the negative z direction. Similarly, the antenna apparatus 220*c* includes two communication modules that are connected in the shape of the letter "L." On the basis of such a configuration, the antenna apparatus 220*c* is held in the vicinity of the edge portion of the housing 201 in the negative y direction relative to the terminal apparatus 200 in such a manner as to allow one of the modules to receive the wireless signals arriving from the negative y direction. Also, at this time, the antenna apparatus 220*c* is held in the vicinity of the surface of the housing 201 in the positive z direction relative to the terminal apparatus 200 (front surface) in such a manner as to allow the other module to receive the wireless signals arriving from the positive z direction.

Figure 4:
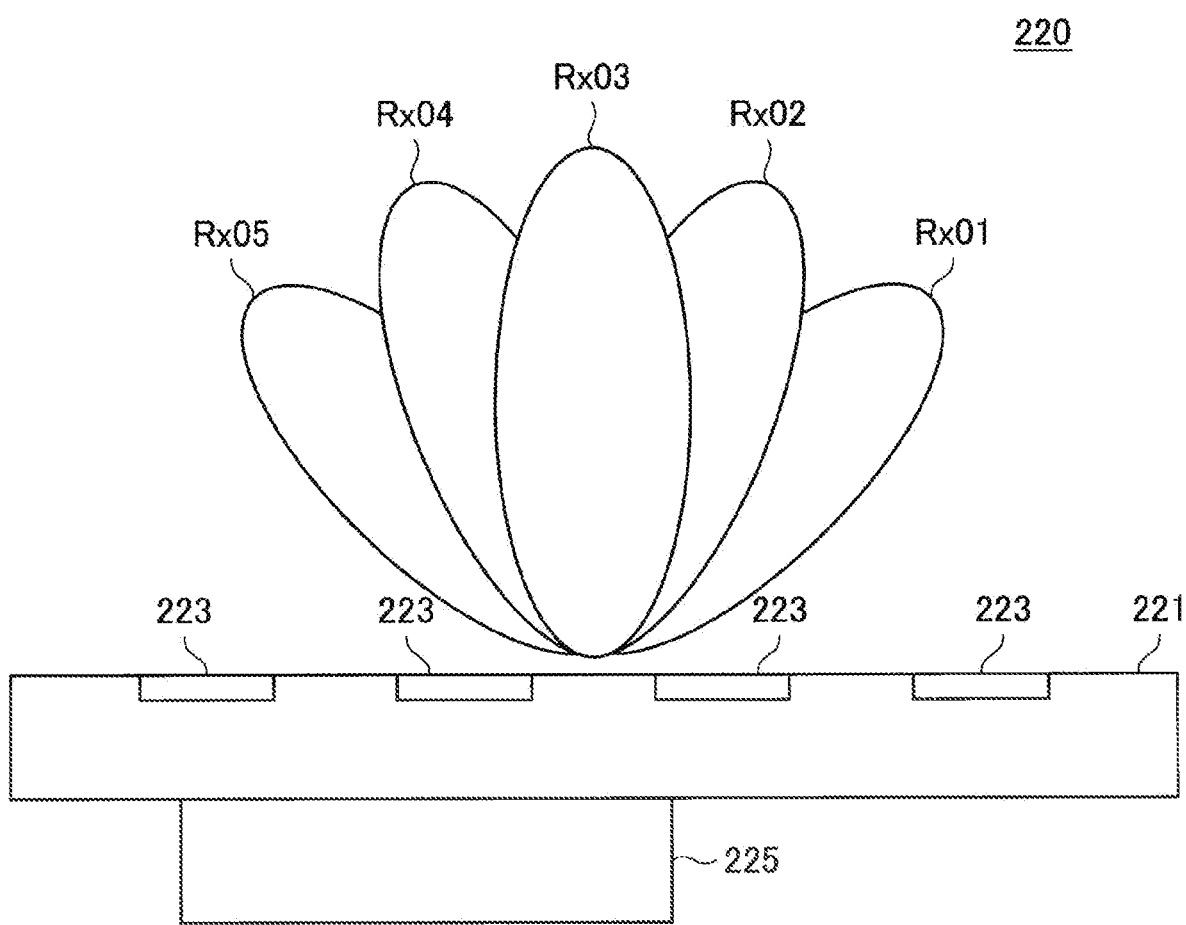
FIG. 4 is an explanatory diagram for describing an example of a schematic configuration of an antenna apparatus applied to the terminal apparatus according to the embodiment.

A description will be given next, in particular, of an example of the case that assumes the formation of a directional beam by using beam forming as in a case where the millimeter waves are used for communication as an example of the configuration of the antenna apparatus 220 (communication section). For example, FIG. 4 is an explanatory diagram for describing an example of the schematic configuration of the antenna apparatus applied to the terminal apparatus 200 according to the embodiment of the present disclosure and illustrates a schematic side view of the antenna apparatus according to the present embodiment. It should be noted that an upper direction in FIG. 4 corresponds to the direction in which the antenna apparatus 220 forms a radiation pattern.

As illustrated in FIG. 4, the antenna apparatus 220 includes a substrate 221, a plurality of antenna components 223, and a control circuit 225 and is configured as an array antenna by combining the plurality of antenna components 223 in question into an array. In the example illustrated in FIG. 4, for example, a planar element is applied as each of the antenna components 223. Specifically, the substrate 221 is formed on an approximately flat plate. The plurality of antenna components 223 are held on the front surface of the substrate 221 in such a manner as to be arranged along the direction of extension of the substrate 221 in question. Also, the control circuit 225 is held on the rear surface of the substrate 221 (i.e., the surface on the opposite side of the surface on which the antenna components 223 are held). The control circuit 225 includes what is called an RFIC (Radio Frequency Integrated Circuit). The control circuit 225 is electrically connected to the plurality of antenna components 223 and controls the driving of the antenna components 223 in question. It should be noted that, although not illustrated in detail in FIG. 4, the control circuit 225 and each of the antenna components 223 are connected via an interconnect layer of the substrate 221.

On the basis of the configuration as described above, it becomes possible, by controlling phases and power of the wireless signals transmitted and received by each of the plurality of antenna components 223, to control the directivity of the wireless signals in question (i.e., perform the beam forming). For example, each of reference signs Rx01 to Rx05 schematically illustrates an example of a directional beam pattern related to the reception of the wireless signals formed by the antenna apparatus 220.

It should be noted that the above is merely an example and that, as long as the directional beams related to the transmission and reception of the wireless signals can be formed, the configuration of the antenna apparatuses 220 is not necessarily limited to that illustrated in FIG. 4. For example, other elements different from planar elements may be applied as the antenna component 223.

Figure 5:
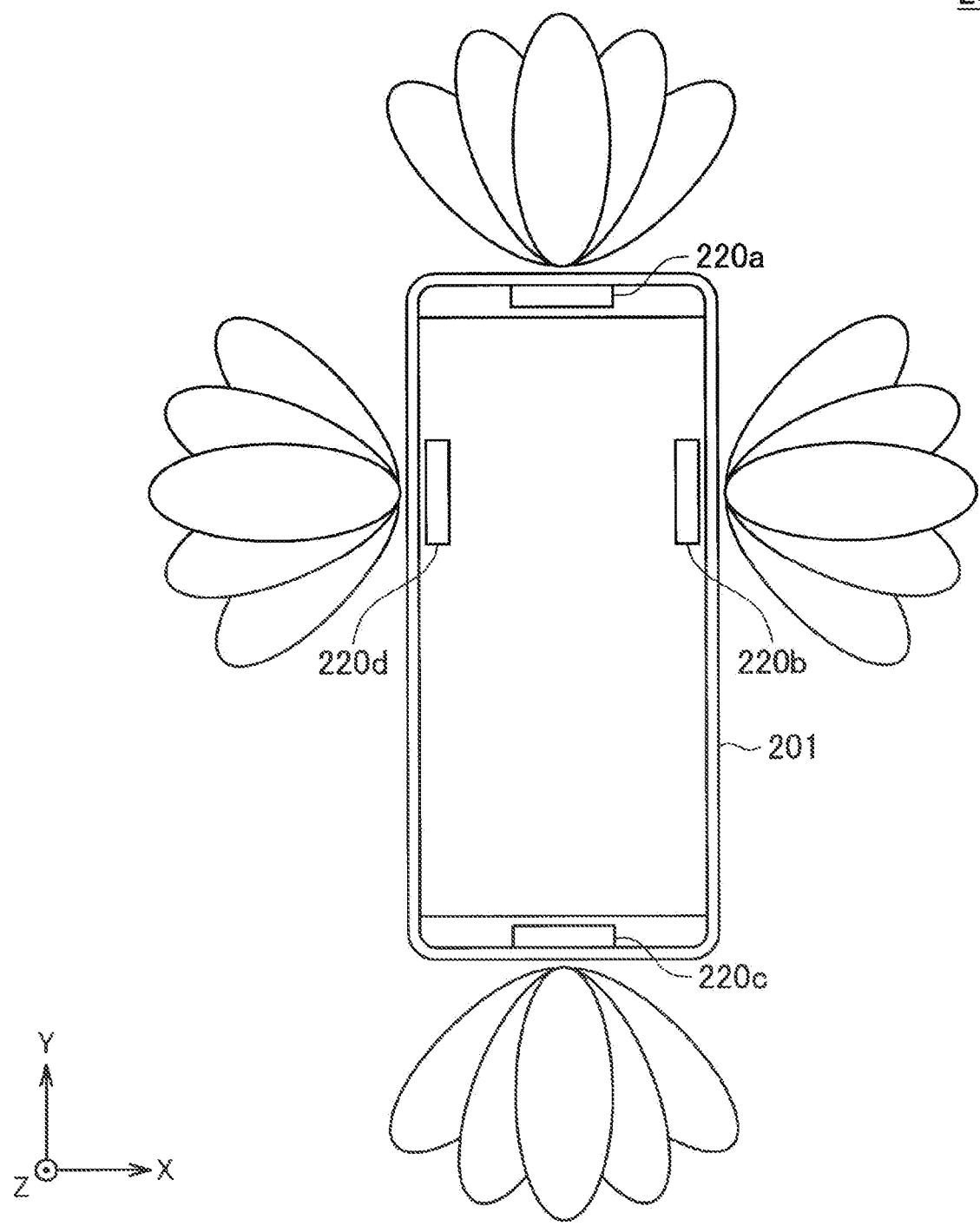
FIG. 5 is an explanatory diagram for outlining an example of a directional beam pattern formed by the terminal apparatus according to the embodiment.

Also, FIG. 5 is an explanatory diagram for outlining an example of the directional beam pattern formed by the terminal apparatus according to the embodiment of the present disclosure. The x, y, and z directions in FIG. 5 correspond to the x, y, and z directions in FIG. 3, respectively. Also, in the example illustrated in FIG. 5, the directional beam patterns formed in the x and y directions are illustrated, and that formed in the z direction is not illustrated for simpler description.

Each of the antenna apparatuses 220a to 220d is configured in such a manner that the directional beams related to the transmission and reception of the wireless signals described with reference to FIG. 4 can be formed. Also, as described with reference to FIG. 3, each of the antenna apparatuses 220a to 220d is supported in such a manner as to be able to receive the wireless signals arriving from the different directions relative to the housing 201 of the terminal apparatus 200. That is, the directional beam patterns, each pointing to a different direction relative to the housing 201, are formed by the antenna apparatuses 220a to 220d, respectively.

Due to the configuration as described above, it becomes possible, regardless the directions relative to the housing 201 of the terminal apparatus 200 from which the wireless signal arrives, to receive the wireless signal in question by using the directional beam formed by any one of the antenna apparatuses 220a to 220d. As a result, by forming the directional beam through the beam forming as in a case where the millimeter waves are used for communication, it becomes possible for the terminal apparatus 200 to receive the wireless signal transmitted from the base station 100 even in the situation where communication between the base station 100 and the terminal apparatus 200 is multiplexed in space in a more preferred manner.

An example of the configuration of the terminal apparatus 200 assuming the use of the millimeter waves in particular has been described above as an example of the schematic configuration of the communication apparatus according to the embodiment of the present disclosure with reference to FIGS. 3 to 5.

3.2. Schematic Operation

An outline will be given next, in particular, of the operation for feeding back the presence of the wireless signal, which has been transmitted from another communication apparatus, to the user, as the schematic operation of the terminal apparatus 200 according to the embodiment of the present disclosure.

The terminal apparatus 200 according to the present embodiment estimates, on the basis of the reception result of the wireless signal transmitted from another communication apparatus (e.g., base station 100), the incoming direction of the wireless signal in question relative to the terminal apparatus 200 and presents, to the user, notification information according to the estimation result in question. That is, the terminal apparatus 200 according to the present embodiment feeds back, to the user, the incoming direction of the wireless signal by presenting the notification information in question.

Figure 6:
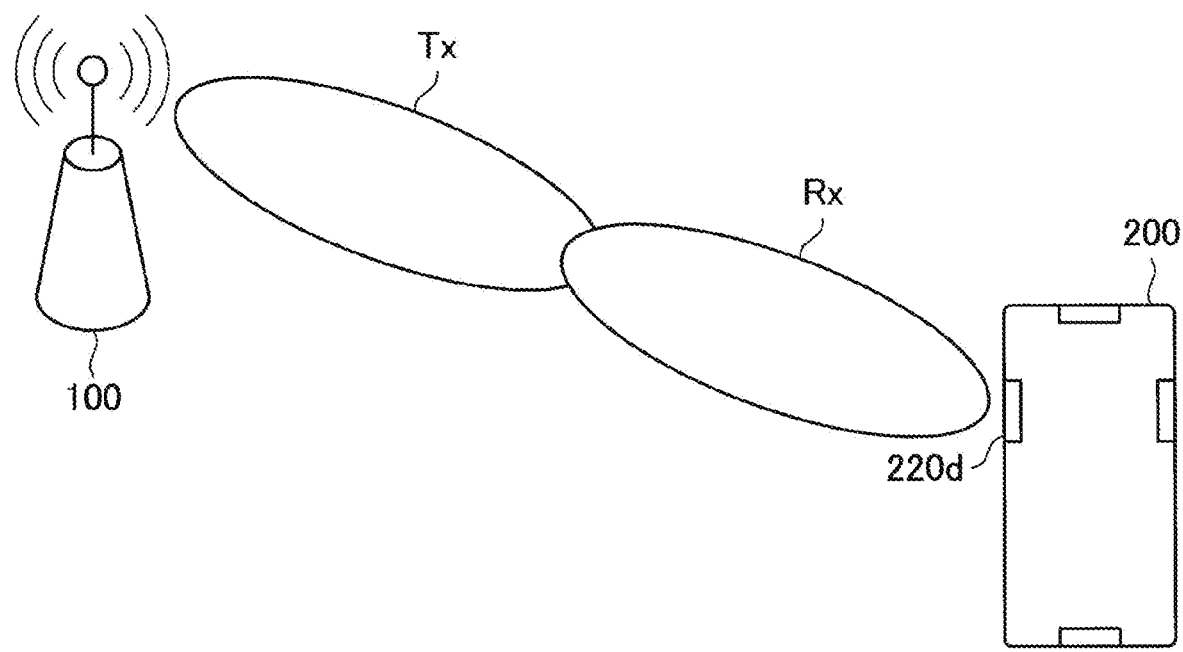
FIG. 6 is an explanatory diagram for outlining a method by which an incoming direction of a wireless signal is estimated.

Here, an outline will be given of a mechanism for the terminal apparatus 200 to estimate the incoming direction of the wireless signal transmitted from another communication apparatus with reference to FIG. 6. FIG. 6 is an explanatory diagram for outlining the method by which the incoming direction of the wireless signal is estimated. In the example illustrated in FIG. 6, an example of the case where the terminal apparatus 200 receives the wireless signal transmitted from the base station 100 is illustrated. In FIG. 6, a reference sign Tx denotes the directional beam formed when the base station 100 transmits the wireless signal (downlink signal). Also, a reference sign Rx denotes the directional beam formed when the terminal apparatus 200 receives the wireless signal transmitted from another communication apparatus (e.g., base station 100). It should be noted that, although a description will be given hereinafter with focus on a case where the terminal apparatus 200 receives the wireless signal transmitted from the base station 100 as in the example illustrated in FIG. 6, this does not limit a party with which the terminal apparatus 200 communicates. That is, details of the description which will be given hereinafter are also applicable to a case where the terminal apparatus 200 communicates with another communication apparatus other than the base station 100 as long as the directional beam is formed on the basis of the beam forming technology.

In a case where the directional beam is formed on the basis of the beam forming technology as in a case where the millimeter waves are used for communication, communication takes place in the state where a BPL (Beam Pear Link) state by beam synchronization is established between the base station 100 and the terminal apparatus 200. That is, the BPL state is established as a result of the base station 100 and the terminal apparatus 200 pointing the directional beams to each other as illustrated in FIG. 6, thus making it possible for the base station 100 and the terminal apparatus 200 to communicate with each other. Because of such characteristics, for example, the terminal apparatus 200 can roughly estimate the incoming direction of the wireless signal transmitted from the base station 100 by discriminating which of the plurality of antenna apparatuses 220 is used to communicate with the base station 100 (e.g., which antenna apparatus 220 has higher reception sensitivity than the others).

Also, as illustrated in FIG. 6, the terminal apparatus 200 forms the directional beam Rx to receive the wireless signal transmitted from the base station 100. Accordingly, by identifying the directional beam Rx used for the reception of the wireless signal transmitted from the base station 100, it becomes possible for the terminal apparatus 200 to more elaborately estimate the incoming direction of the wireless signal in question. It should be noted that directional beams are formed by the antenna apparatuses 220*a* to 220*d* as described with reference to FIG. 5. Accordingly, for example, it becomes possible, by using identification information (e.g., beam ID) individually associated with the directional beams formed, respectively, by the antenna apparatuses 220*a* to 220*d*, to identify the directional beam used for the reception of the wireless signal.

It should be noted that the above is merely an example and that, as long as the incoming direction of the wireless signal transmitted from the base station 100 can be estimated, the estimation method is not necessarily limited to that described above. As a specific example, it is possible, by identifying the directional beam Tx formed by the base station 100 to transmit the wireless signal, to estimate the incoming direction of the wireless signal relative to the terminal apparatus 200. Specifically, it is possible, on the basis of information indicating the position where the base station 100 is installed and identification information of the directional beam Tx, to calculate the direction from which the wireless signal is transmitted from the base station 100 by using the directional beam Tx in question. The terminal apparatus 200 may estimate the incoming direction of the wireless signal transmitted from the base station 100 in question by using such characteristics.

As described above, the terminal apparatus 200 estimates the incoming direction of the wireless signal transmitted from the base station 100 and feeds back, to the user, the incoming direction of the wireless signal in question by notifying notification information according to the estimation result in question.

The outline of the operation for feeding back the presence of the wireless signal, which has been transmitted from another communication apparatus, to the user in particular will be described above as the schematic operation of the terminal apparatus 200 according to the embodiment of the present disclosure with reference to FIG. 6.

3.3. Working Examples

A description will be given next of examples of the method by which information according to the estimation result of the incoming direction of the wireless signal is fed back, as working examples of the communication apparatus according to the embodiment of the present disclosure.

Working Example 1

Figure 7:
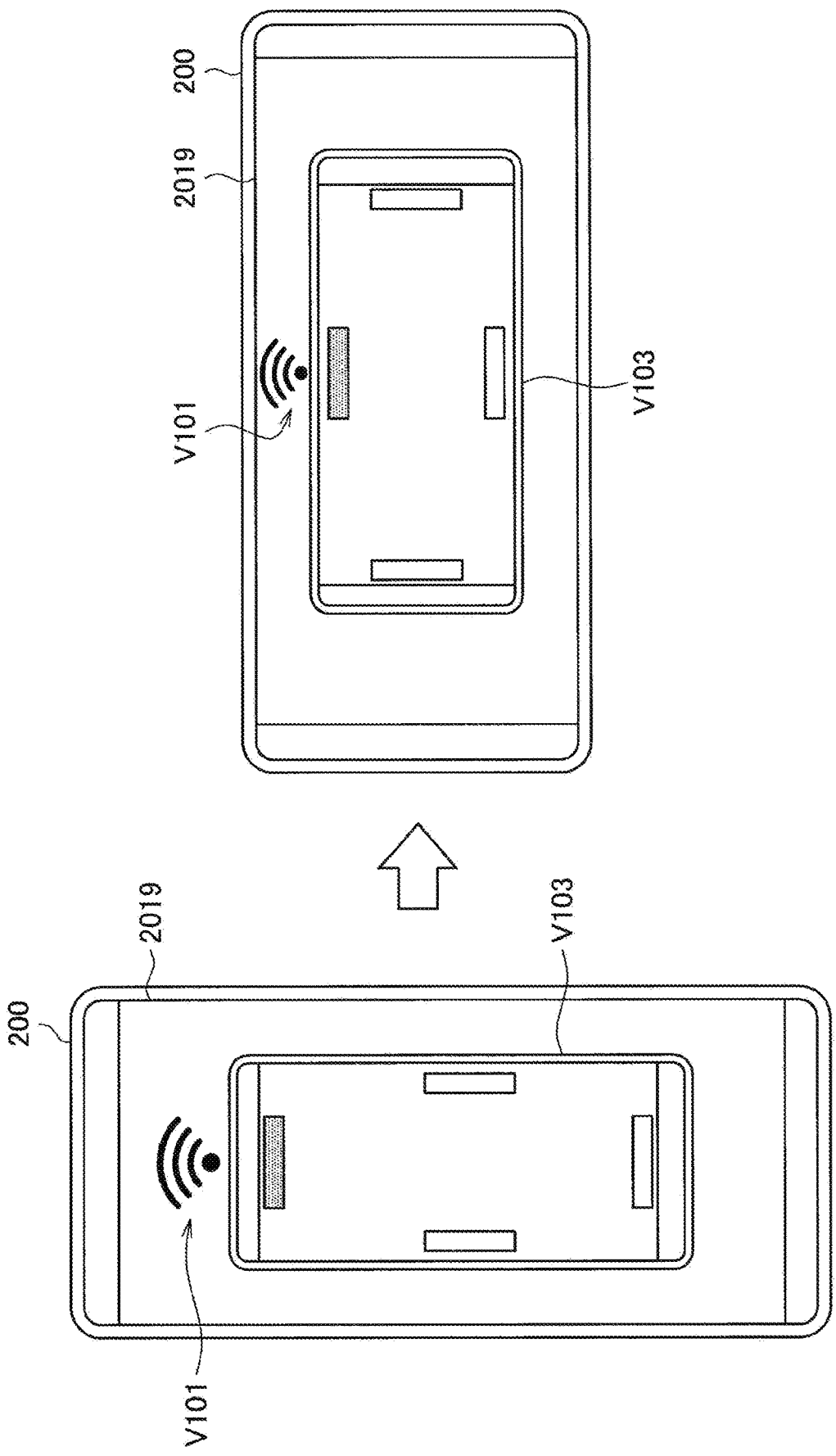
FIG. 7 is an explanatory diagram for describing an example of a method by which information according to an estimation result of the incoming direction of the wireless signal is fed back by the communication apparatus according to working example 1.

A description will be given of an example of the method by which information according to the estimation result of the incoming direction of the wireless signal is fed back, as working example 1 with reference to FIG. 7. FIG. 7 is an explanatory diagram for describing an example of the method by which information according to the estimation result of the incoming direction of the wireless signal is fed back by the communication apparatus according to the working example 1. FIG. 7 illustrates an example of a case where information is fed back to the user as display information by using, as the output section 2009 illustrated in FIG. 2, a display section 2019 such as what is called a display for presenting information to the user by displaying display information such as an image (e.g., video or still image).

Specifically, in the example illustrated in FIG. 7, display information V101 and display information 103 are presented via the display section 2019. The display information V103 is information for feeding back, of the plurality of antenna apparatuses 220 (communication sections) included in the terminal apparatus 200, the antenna apparatus 220 used for the reception of the wireless signal to the user. Specifically, an image imitating the terminal apparatus 200 is presented as the display information V103, and the position of each of the plurality of antenna apparatuses 220 provided in the terminal apparatus 200 is presented as an icon on the image in question. Also, of the icons corresponding, respectively, to the plurality of antenna apparatuses 220, the icon corresponding to the antenna apparatus 220 used for the reception of the wireless signal is highlighted. That is, as a result of the presentation of the display information V103, the position where the antenna apparatus 220 used for the reception of the wireless signal is supported (e.g., the antenna apparatus 220 with higher reception sensitivity) is fed back to the user. Also, the display information V101 is information for feeding back the incoming direction of the wireless signal to the user. Specifically, the display information V101 indicates the direction from which the wireless signal arrives at the terminal apparatus 200 by using a relative position presented by using the display information V103, which imitates the terminal apparatus 200, as a base point.

In the diagram illustrated on the left in FIG. 7, for example, the display information V101 is presented above the display information V103. That is, the example in FIG. 7 illustrates that the wireless signal arrives at the terminal apparatus 200 from the direction equivalent to the upper side in the figure and that the antenna apparatus 220 located on the side of the direction in question is used for the reception of the wireless signal in question.

Also, the diagram on the right in FIG. 7 illustrates, by rotating the terminal apparatus 200 from the state illustrated in the diagram on the left in FIG. 7, the state in which the posture of the terminal apparatus 200 in question has changed. In this case, the incoming direction of the wireless signal relative to the terminal apparatus 200 changes relatively. Accordingly, in the diagram on the right in FIG. 7, the position where the display information V101 is presented has changed according to the incoming direction of the wireless signal relative to the terminal apparatus 200 in the state after the posture of the terminal apparatus 200 has changed. Also, in the diagram on the right in FIG. 7, the antenna apparatus 220 used for the reception of the wireless signal changes, thus changing the icon to be highlighted in the display information V103 from that in the diagram on the left.

An example of the method by which information according to the estimation result of the incoming direction of the wireless signal is fed back has been described above as the working example 1 with reference to FIG. 7.

Working Example 2

Figure 8:
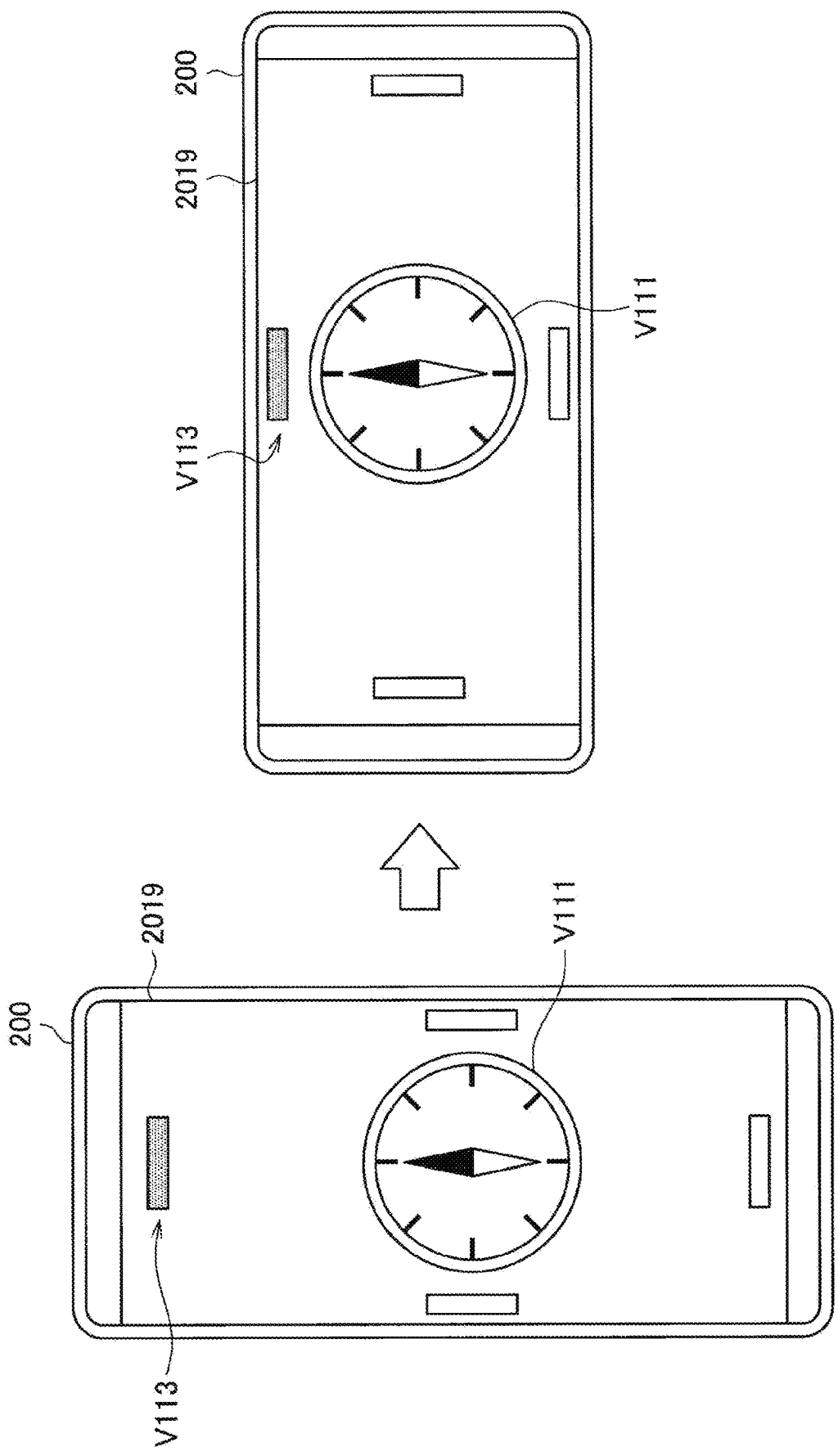
FIG. 8 is an explanatory diagram for describing an example of the method by which information according to the estimation result of the incoming direction of the wireless signal is fed back by the communication apparatus according to working example 2.

A description will be given of another example of the method by which information according to the estimation result of the incoming direction of the wireless signal is fed back, as working example 2 with reference to FIG. 8. FIG. 8 is an explanatory diagram for describing an example of the method by which information according to the estimation result of the incoming direction of the wireless signal is fed back by the communication apparatus according to the working example 2. FIG. 8 illustrates another example of a case where information is fed back to the user as display information via the display section 2019.

Specifically, FIG. 8 illustrates another example of a case where information indicating the position of the antenna apparatus 220 used for the reception of the wireless signal transmitted from the base station 100 and information indicating the incoming direction of the wireless signal in question are presented.

In the example illustrated in FIG. 8, display information V111 and display information V113 are presented via the display section 2019. The display information V113 is information for feeding back, of the plurality of antenna apparatuses 220 (communication sections) included in the terminal apparatus 200, the antenna apparatus 220 used for the reception of the wireless signal to the user. Specifically, icons corresponding to the plurality of antenna apparatuses 220, are presented as the display information V113 at the positions on the screen of the display section 2019 according to the positions where the antenna apparatuses 220 are held. That is, the provision of the antenna apparatuses 220, respectively, in the vicinity of the upper, lower, leftward, and rightward edge portions of the housing 201 of the terminal apparatus 200 is illustrated by presenting icons, respectively, in the vicinity of the upper, lower, leftward, and rightward edge portions on the screen of the display section 2019. Also, of the icons corresponding, respectively, to the plurality of antenna apparatuses 220, the icon corresponding to the antenna apparatus 220 used for the reception of the wireless signal is highlighted. Also, the display information V111 is information for feeding back the incoming direction of the wireless signal to the user. Specifically, the display information V111 is presented as an image imitating a direction indicator such as a compass and indicates the incoming direction of the wireless signal by using the posture at the time of the presentation.

For example, in the diagram illustrated on the left in FIG. 8, the display information V111 points to the direction equivalent to the upper side in the figure. Also, in the diagram illustrated on the left in FIG. 8, of the icons corresponding, respectively, to the plurality of antenna apparatuses 220 presented as the display information V113, the icon corresponding to the direction equivalent to the upper side in the figure is highlighted. That is, the example in FIG. 8 illustrates that the wireless signal arrives at the terminal apparatus 200 from the direction equivalent to the upper side in the figure and that the antenna apparatus 220 located on the side of the direction in question is used for the reception of the wireless signal in question.

Also, the diagram on the right in FIG. 8 illustrates, by rotating the terminal apparatus 200 from the state illustrated in the diagram on the left in FIG. 8, the state in which the posture of the terminal apparatus 200 in question has changed. In this case, the incoming direction of the wireless signal relative to the terminal apparatus 200 relatively changes. Accordingly, in the diagram on the right in FIG. 8, the direction pointed to by the display information V111 (relative direction relative to the terminal apparatus 200) has changed according to the incoming direction of the wireless signal relative to the terminal apparatus 200 in question in the state after the posture of the terminal apparatus 200 has changed. Also, in the diagram on the right in FIG. 8, the antenna apparatus 220 used for the reception of the wireless signal changes. As a result, of the icons presented as the display information V113, the highlighted icon changes from that in the diagram on the left.

Another example of the method by which information according to the estimation result of the incoming direction of the wireless signal is fed back has been described above as the working example 2 with reference to FIG. 8.

Working Example 3

Figure 9:
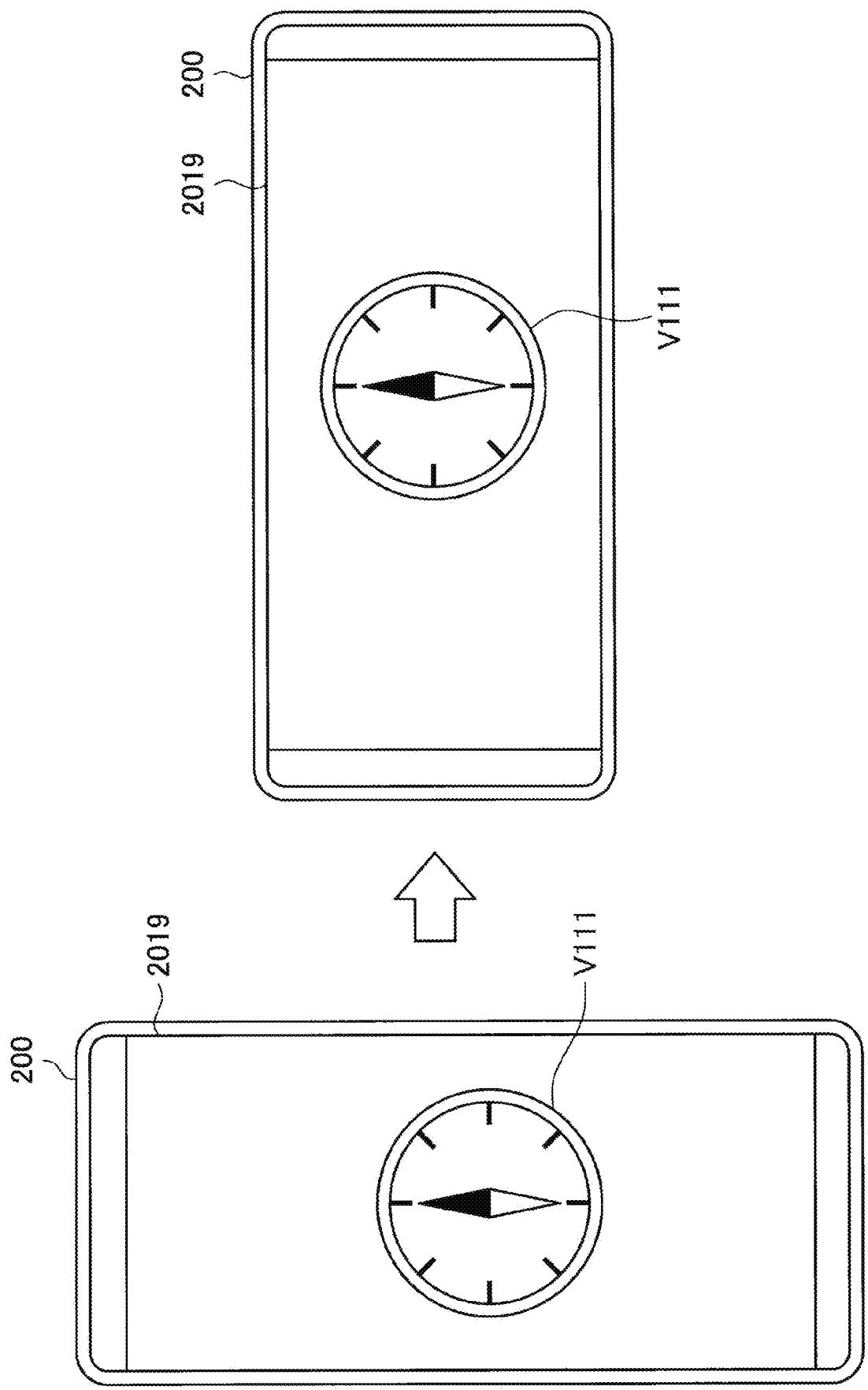
FIG. 9 is an explanatory diagram for describing an example of the method by which information according to the estimation result of the incoming direction of the wireless signal is fed back by the communication apparatus according to working example 3.

A description will be given of still another example of the method by which information according to the estimation result of the incoming direction of the wireless signal is fed back, as working example 3 with reference to FIG. 9. FIG. 9 is an explanatory diagram for describing an example of the method by which information according to the estimation result of the incoming direction of the wireless signal is fed back by the communication apparatus according to the working example 3. FIG. 9 illustrates still another example of a case where information is fed back to the user as display information via the display section 2019.

Specifically, FIG. 9 illustrates an example of a case where information indicating the incoming direction of the wireless signal is presented.

In the example illustrated in FIG. 9, the display information V111 is presented via the display section 2019. The display information V111 is information for feeding back the incoming direction of the wireless signal to the user and is equivalent to the display information Viii in the example illustrated in FIG. 8. Accordingly, the detailed description of the display information Viii is omitted.

For example, in the diagram illustrated on the left in FIG. 9, the display information Viii points upward. That is, the example illustrated in FIG. 9 illustrates that the wireless signal arrives at the terminal apparatus 200 from the direction equivalent to the upper side in the figure.

Also, the diagram on the right in FIG. 9 illustrates, by rotating the terminal apparatus 200 from the state illustrated in the diagram on the left in FIG. 9, the state in which the posture of the terminal apparatus 200 in question has changed. In this case, the direction pointed to by the display information V111 (relative direction relative to the terminal apparatus 200) has changed according to the incoming direction of the wireless signal to the terminal apparatus 200 in question in the state after the posture of the terminal apparatus 200 has changed as in the example described with reference to FIG. 8.

Still another example of the method by which information according to the estimation result of the incoming direction of the wireless signal is fed back has been described above as the working example 3 with reference to FIG. 9.

Working Example 4

Figure 10:
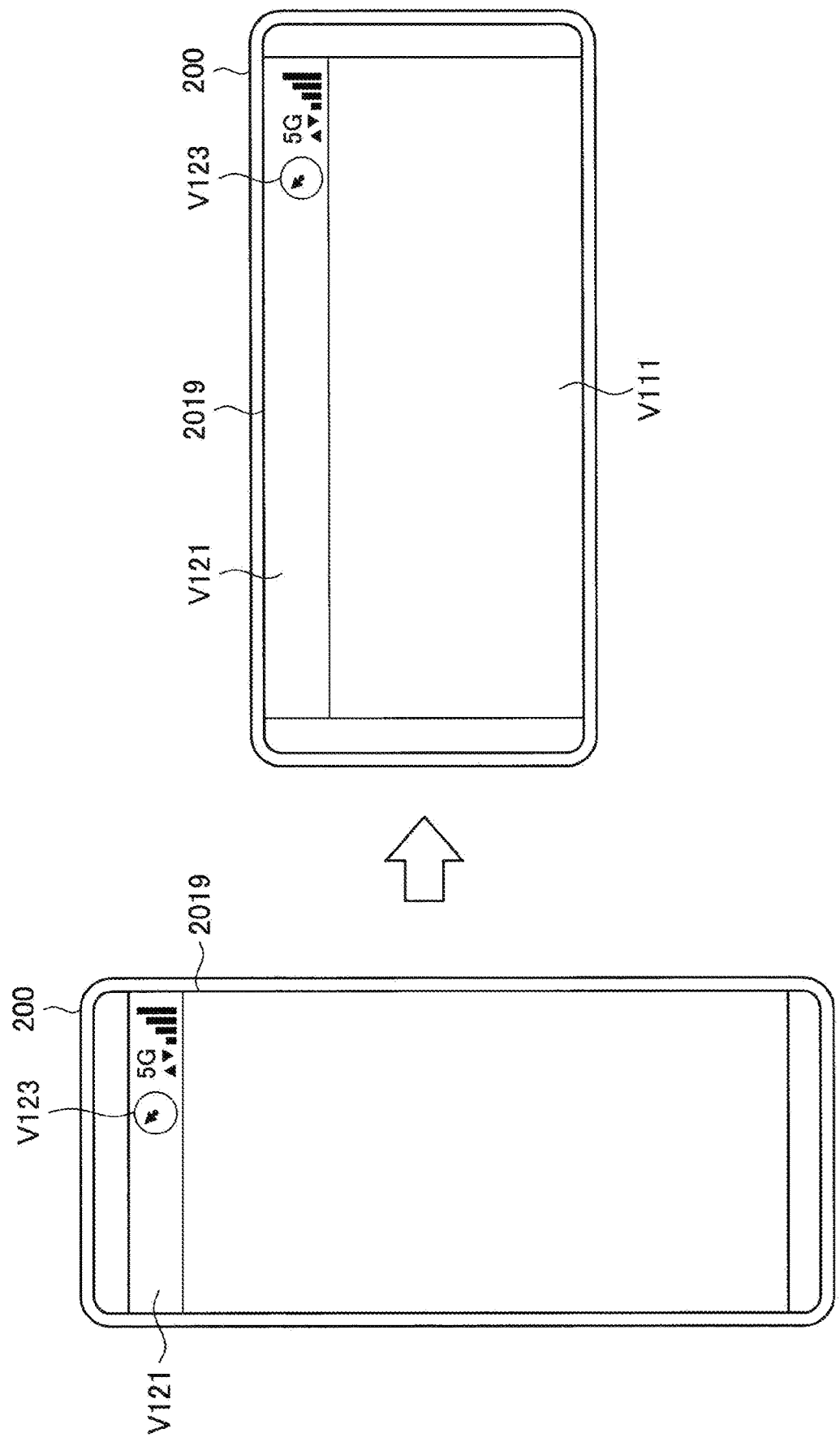
FIG. 10 is an explanatory diagram for describing an example of the method by which information is fed back by the communication apparatus according to working example 4 according to the estimation result of the incoming direction of the wireless signal.

A description will be given of yet another example of the method by which information according to the estimation result of the incoming direction of the wireless signal is fed back, as working example 4 with reference to FIG. 10. FIG. 10 is an explanatory diagram for describing an example of the method by which information according to the estimation result of the incoming direction of the wireless signal is fed back by the communication apparatus according to the working example 4. FIG. 10 illustrates yet another example of a case where information is fed back to the user as display information via the display section 2019.

Specifically, the example in FIG. 10 illustrates an example of a case where the icon indicating the incoming direction of the wireless signal is presented in an area where various icons such as the icon indicating the radio wave strength are displayed.

In FIG. 10, a reference sign V121 schematically illustrates the area where various icons are presented. Also, also, an icon V123 is presented in the area V121. The icon V123 is information for feeding back the incoming direction of the wireless signal. Specifically, the icon V123 is presented as an image imitating a direction indicator such as a compass and indicates the incoming direction of the wireless signal by using the posture at the time of the presentation.

Also, the diagram on the right in FIG. 9 illustrates, by rotating the terminal apparatus 200 from the state illustrated in the diagram on the left in FIG. 9, the state in which the posture of the terminal apparatus 200 in question has changed. The position on the screen of the display section 2019 where the area V121 is presented changes according to the change in posture of the terminal apparatus 200. Also, the direction pointed to by the icon V123 (relative direction relative to the terminal apparatus 200) has changed according to the incoming direction of the wireless signal relative to the terminal apparatus 200 in question in the state after the posture of the terminal apparatus 200 has changed.

Yet another example of the method by which information according to the estimation result of the incoming direction of the wireless signal is fed back has been described above as the working example 4 with reference to FIG. 10.

Working Example 5

Figure 11:
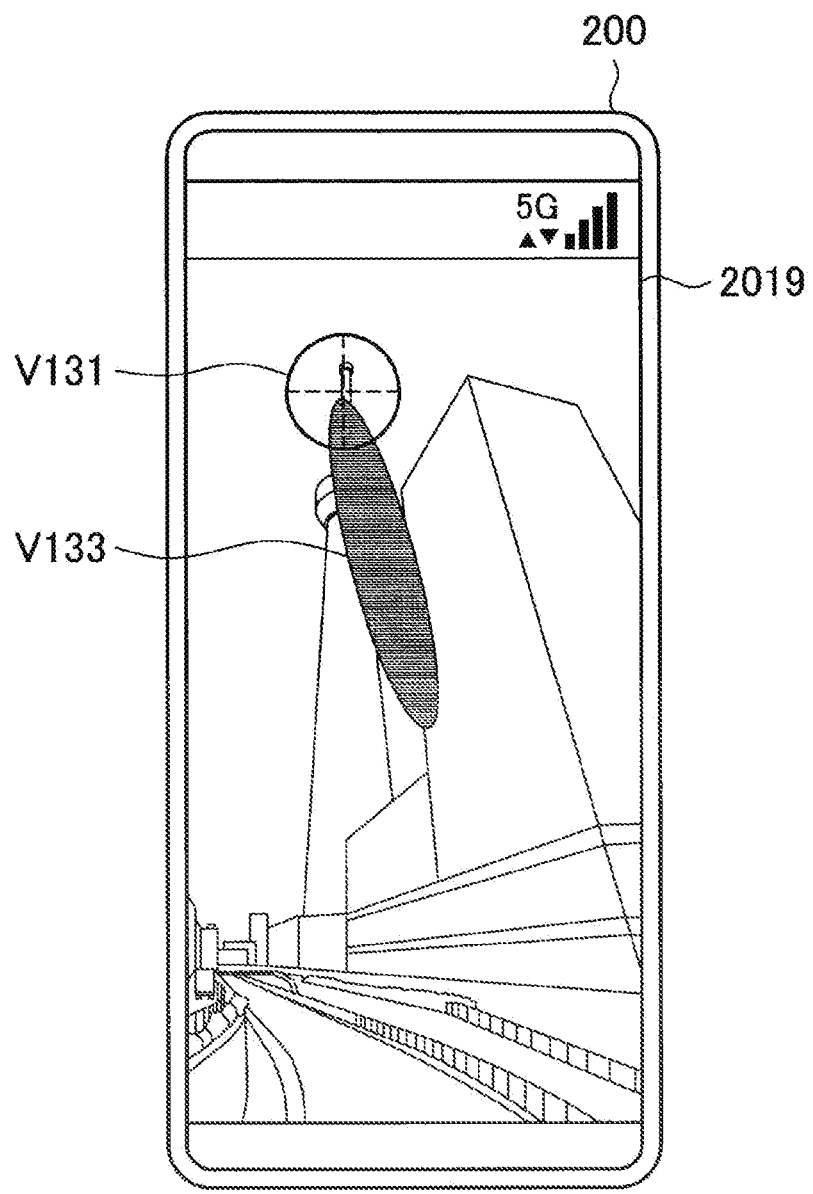
FIG. 11 is an explanatory diagram for describing an example of the method by which information according to the estimation result of the incoming direction of the wireless signal is fed back by the communication apparatus according to working example 5.

A description will be given of a further example of the method by which information according to the estimation result of the incoming direction of the wireless signal is fed back, as working example 5 with reference to FIG. 11. FIG. 11 is an explanatory diagram for describing an example of the method by which information according to the estimation result of the incoming direction of the wireless signal is fed back by the communication apparatus according to the working example 5. FIG. 11 illustrates a further example of a case where information is fed back to the user as display information via the display section 2019.

Specifically, in the example illustrated in FIG. 11, the incoming direction of the wireless signal is fed back to the user by causing display information according to the estimation result of the incoming direction of the wireless signal to be displayed in a manner superimposed on a real space on the basis of AR technology.

In the example illustrated in FIG. 11, a video image of the real space captured by an imaging apparatus or the like is displayed via the display section 2019, and display information V131 is presented in a manner superimposed on the video image in question. Also, display information V133 may be presented in addition to the display information V131 as illustrated in FIG. 11. The display information V131 is information for feeding back the incoming direction of the wireless signal to the user and is presented at the position within the screen of the display section 2019 according to the incoming direction of the wireless signal within an angle of view of the imaging apparatus that captures the video image of the real space. That is, it can be also said that the display information V131 schematically illustrates the position of a transmitter of the wireless signal in the real space. Also, the display information V133 is display information acquired by visualizing the directional beam related to the transmission of the wireless signal.

On the basis of such a configuration, as a result of the display information V131 being displayed within the screen of the display section 2019, it becomes possible for the antenna apparatus 220 (communication section) capable of forming the directional beam in the direction of an optical axis of the imaging apparatus that captures the video image of the real space to receive the wireless signal arriving from the direction of the optical axis. That is, it becomes possible for the terminal apparatus 200 in question to receive the wireless signal transmitted from the base station 100 if the user changes the posture of the terminal apparatus 200 in such a manner that the display information V131 is displayed in the screen of the display section 2019.

A further example of the method by which information according to the estimation result of the incoming direction of the wireless signal is fed back has been described above as the working example 5 with reference to FIG. 11.

Working Example 6

Figure 12:
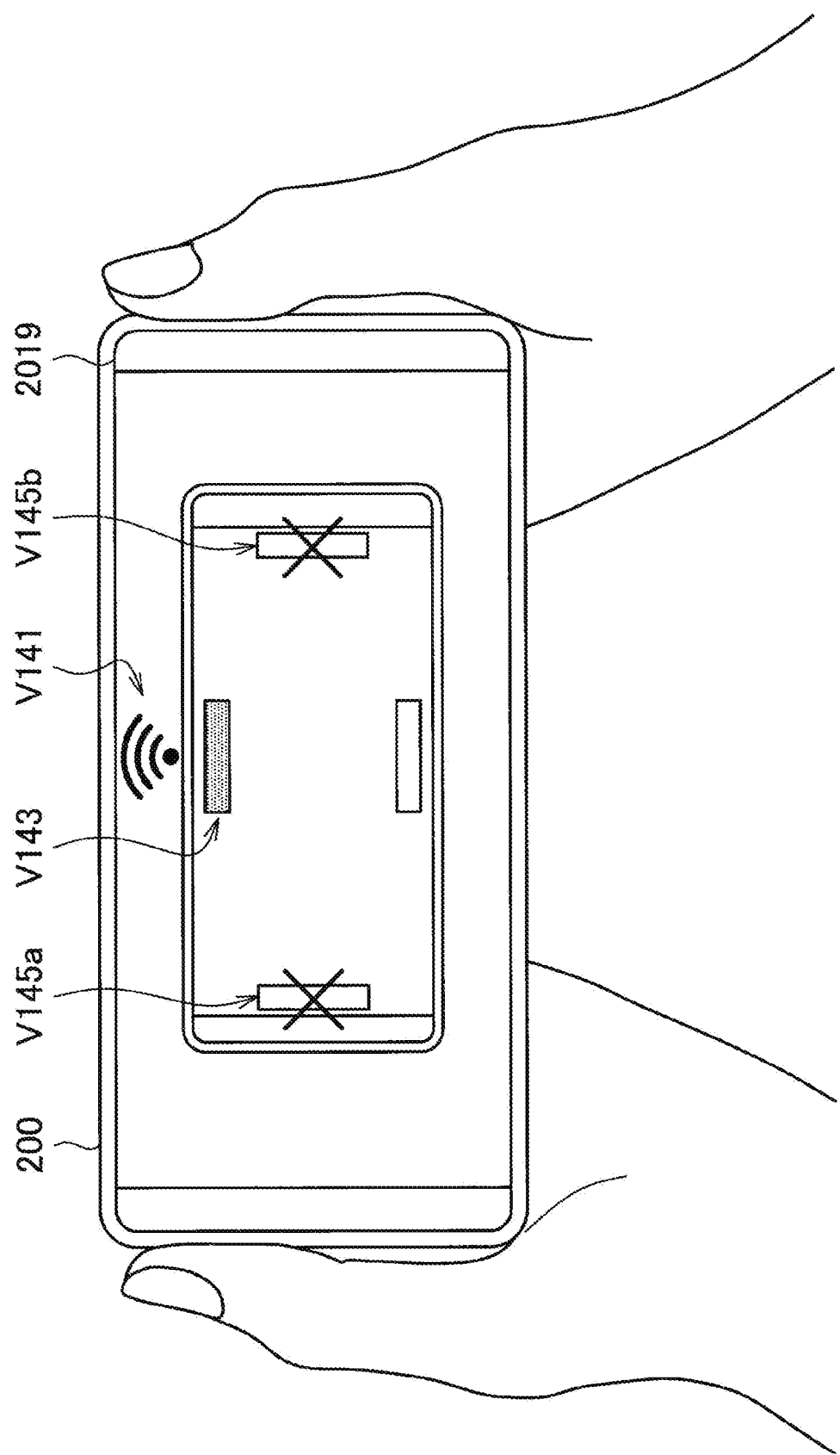
FIG. 12 is an explanatory diagram for describing an example of the method by which information according to the estimation result of the incoming direction of the wireless signal is fed back by the communication apparatus according to working example 6.
Figure 13:
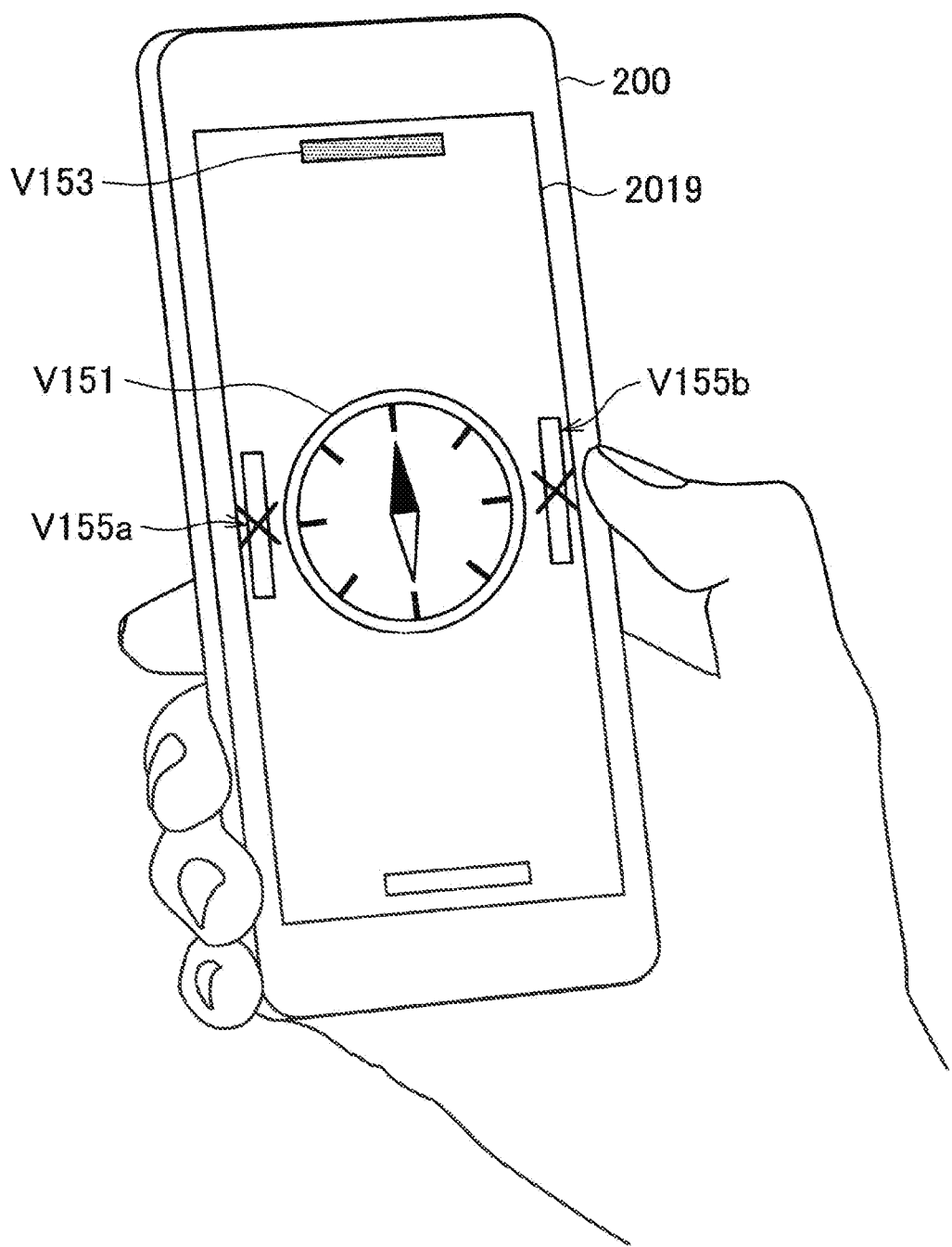
FIG. 13 is an explanatory diagram for describing an example of the method by which information according to the estimation result of the incoming direction of the wireless signal is fed back by the communication apparatus according to the working example 6.

A description will be given of a still further example of the method by which information according to the estimation result of the incoming direction of the wireless signal is fed back, as working example 6 with reference to FIGS. 12 and 13. FIGS. 12 and 13 are explanatory diagrams for describing an example of the method by which information according to the estimation result of the incoming direction of the wireless signal is fed back by the communication apparatus according to the working example 6.

As described earlier, if millimeter waves are shielded by a building, a human, a vehicle, or other shields, it becomes temporarily difficult in some cases to acquire sufficient radio wave strength. This also holds true for a user's hand gripping the housing 201 of the terminal apparatus 200. That is, if the communication channels directly connecting some of the antenna apparatuses 220 and the base station 100 are shielded by the user's hand, according to the method by which the housing 201 is gripped, it becomes difficult in some cases for the antenna apparatuses 220 in question to receive the wireless signals transmitted from the base station 100 in question. In consideration of such a situation, in a case where, according to the method by which the housing 201 is gripped, at least some of the antenna apparatuses 220 are covered with the user's hand, the terminal apparatus 200 according to the present working example notifies the user of information in such a manner that the user in question can identify the antenna apparatuses 220 in question.

For example, FIG. 12 illustrates an example of a case where the housing 201 of the terminal apparatus 200 is held in such a posture that the long length direction of the housing 201 in question as seen from the user approximately agrees with a lateral direction of the user in question. In other words, in the example illustrated in FIG. 12, the housing 201 is held in such a manner that the screen of the display section 2019 is in landscape orientation. Also, at this time, both of the edge portions of the housing 201 in question in the long length direction are gripped by the user's hand. That is, FIG. 12 schematically illustrates the state in which the antenna apparatuses 220 each provided in the vicinity of both of the edge portions of the housing 201 in the long length direction are covered with the user's hand. Accordingly, in the example illustrated in FIG. 12, the terminal apparatus 200 feeds back, to the user, not only the incoming direction of the wireless signal but also the antenna apparatuses 220 having difficulty in receiving the wireless signal because of the covering with the hand.

Specifically, the terminal apparatus 200 feeds back, to the user, the incoming direction of the wireless signal by presenting display information V141. Also, the terminal apparatus 200 highlights, of the icons presented, respectively, in a manner associated with the plurality of antenna apparatuses 220, an icon V143 associated with the antenna apparatus 220 that is used for the reception of the wireless signal. This operation is similar to that described with reference to FIG. 7.

In addition, in the example illustrated in FIG. 12, the terminal apparatus 200 feeds back, to the user, the fact that it is difficult to use the antenna apparatuses 220 covered with the user's hand, by superimposing display information V145a and display information V145b on the icons associated with the antenna apparatuses 220 in question. It should be noted that the method by which the covering of some of the antenna apparatuses 220 with the user's hand is detected is not particularly limited. As a specific example, the covering of some of the antenna apparatuses 220 with the user's hand may be detected by using various sensors such as a contact sensor and a proximity sensor. Also, in a case where the covering of some of the antenna apparatuses 220 with the user's hand is detected, the terminal apparatus 200 may give priority to measurement of the reception sensitivity of the wireless signal by other antenna apparatuses 220.

Also, FIG. 13 illustrates an example of a case where the housing 201 of the terminal apparatus 200 is held in such a posture that the long length direction of the housing 201 in question as seen from the user approximately agrees with the lateral direction of the user in question. In other words, in the example illustrated in FIG. 13, the housing 201 is held in such a manner that the screen of the display section 2019 is in portrait orientation. Also, at this time, both of the edge portions of the housing 201 in question in the short length direction are gripped by the user's hand. That is, FIG. 13 schematically illustrates the state in which the antenna apparatuses 220 each provided in the vicinity of both of the edge portions of the housing 201 in the short length direction are covered with the user's hand. Accordingly, in the example illustrated in FIG. 13, the terminal apparatus 200 feeds back, to the user, not only the incoming direction of the wireless signal but also the antenna apparatuses 220 having difficulty in receiving the wireless signal because of being covered with the hand.

Specifically, the terminal apparatus 200 feeds back, to the user, the incoming direction of the wireless signal by presenting display information V151. Also, the terminal apparatus 200 highlights, of the icons presented, respectively, in a manner associated with the plurality of antenna apparatuses 220, an icon V153 associated with the antenna apparatus 220 that is used for the reception of the wireless signal. This operation is similar to that described with reference to FIG. 8.

In addition, in the example illustrated in FIG. 13, the terminal apparatus 200 feeds back, to the user, the fact that it is difficult to use the antenna apparatuses 220 covered with the user's hand, by superimposing display information V155*a* and display information V155*b* on the icons associated with the antenna apparatuses 220 in question.

Also, the terminal apparatus 200 according to the present working example may present information regarding guidance as to the method by which the housing 201 is to be gripped, according to the posture in which the housing 201 in question is held and the estimation result of the incoming direction of the wireless signal (in other words, the identification result of the antenna apparatus 220 used for the reception of the wireless signal). For example, FIG. 14 is an explanatory diagram for outlining an example of an operation related to guidance given regarding the method by which the housing 201 is to be gripped, the operation being conducted by the communication apparatus according to the present working example.

Specifically, in the example illustrated in FIG. 14, the wireless signal arrives from one of the long length directions of the housing 201 (left side in FIG. 14), with the housing 201 held in such a posture that the screen of the display section 2019 is in landscape orientation. In such a case, it is not preferable for the antenna apparatus 220 used for the reception of the wireless signal (antenna apparatus 220 associated with the highlighted icon V143) to be covered with the hand. Accordingly, the terminal apparatus 200 may guide the user in question, by presenting information indicating the position by which the housing 201 is to be gripped or by other ways, in such a manner that the antenna apparatus 220 expected to be used for the reception of the wireless signal is not covered with the user' hand. For example, in a case of the example illustrated in FIG. 14, the terminal apparatus 200 may guide the user in such a manner that, of the edge portions of the housing 201 in the long length directions, the edge portion in the direction equivalent to the right side in FIG. 14 is held by the user in question.

Also, in a case where it is possible to estimate, by a trigger such as activation of content, the posture in which the housing 201 is held, the terminal apparatus 200 may present, to the user, information regarding guidance as to the method by which the housing 201 in question is to be gripped, on the basis of the estimation result of the posture in question. As a specific example, in the situation where video image content is viewed, it is estimated that the housing 201 is held in such a manner that the screen of the display section 2019 is in landscape orientation. Accordingly, the terminal apparatus 200 may present, to the user, information indicating the method by which the housing 201 is to be gripped (e.g., the position at which the housing 201 is to be gripped), on the basis of the estimation result of the posture of the housing 201 in question and the estimation result of the incoming direction of the wireless signal in such a manner that the incoming direction of the wireless signal is not covered with the user's hand.

(Supplement)

Although the working examples of the communication apparatus according to an embodiment of the present disclosure have been described above, those described above are merely examples and do not necessarily limit various functions of the communication apparatus according to the present embodiment. That is, some of the functions and constituents may be changed without departing from a scope of a basic technical philosophy according to the present disclosure, i.e., the technical philosophy that the incoming direction of the wireless signal is estimated according to a reception result of the wireless signal and that information according to the estimation result in question is presented.

As a specific example, in the situation where the wireless signals arrive at the communication apparatus (terminal apparatus 200) from the plurality of directions, a plurality of options of information may be presented as information according to the estimation result of the incoming direction of the wireless signal. Also, at this time, all the options of information may be presented. Alternatively, some of the options of information (e.g., predetermined number of options in decreasing order of reception sensitivity) may be presented. Also, when the plurality of options of information are presented, the options of information with the higher reception sensitivity may be highlighted more. Naturally, in a case where there are two or more options, information of only one of the options may be presented. In this case, it is only necessary to identify one of the options from among the plurality of options on the basis of the predetermined condition and present information regarding the identified option in question. As a specific example, the option with the higher reception sensitivity may be identified as a target.

Also, in a case where the plurality of communication sections (e.g., antenna apparatuses 220) are used for the reception of the wireless signal, pieces of information each associated with the plurality of communication sections in question may be highlighted. Also, at this time, the manner in which the pieces of information each corresponding to the plurality of communication sections in question are presented may be controlled according to an extent to which each of the plurality of communication sections used for the reception of the wireless signal contributes to the reception in question. As a specific example, of the plurality of communication sections used for the reception of the wireless signal, the piece of information corresponding to the communication section that contributes more to the reception in question may be highlighted.

Also, an occasion related to the estimation of the incoming direction of the wireless signal and the presentation of information according to the estimation result in question is not particularly limited. As a specific example, the incoming direction of the wireless signal may be estimated in real time. In this case, information according to the estimation result in question may be presented in real time in conjunction with the estimation of the incoming direction of the wireless signal, or the information may be presented in response to the predetermined trigger. Also, the estimation of the incoming direction of the wireless signal and the presentation of information according to the estimation result in question may be conducted in response to the predetermined trigger. As a specific example, in a case where the position or the posture of the communication apparatus (terminal apparatus 200) changes abruptly, the estimation of the incoming direction of the wireless signal and the presentation of information according to the estimation result in question may be conducted by using the change in question in the detection result as the trigger. Also, the method by which the incoming direction of the wireless signal is estimated may be changed as appropriate in consideration of a use case. As a specific example, the estimation of the incoming direction of the wireless signal may be conducted on the basis of the reception result of the wireless signal at that time. Also, as another example, information according to the reception result of the wireless signal may be accumulated sequentially, thus statistically estimating the incoming direction of the wireless signal in question on the basis of a tallying result of the information in question for a predetermined period of time.

Also, although the examples of the cases where the feedback to the user is realized by the presentation of display information have been described above, information types and the method by which information is presented are not particularly limited as long as it is possible to feed back desired information to the user. As a specific example, information according to the estimation result of the incoming direction of the wireless signal may be presented via an acoustic output section such as a speaker as a voice or acoustics. As another example, information according to the estimation result in question may be presented as a tactile sensation or a force sensation by vibrating the vibration section such as an actuator, according to the estimation result of the incoming direction of the wireless signal.

4. Hardware Configuration

A description will be given next of an example of a hardware configuration of the information processing apparatus (e.g., the terminal apparatus 200 illustrated in FIG. 2) included in the system according to the present embodiment with reference to FIG. 15. FIG. 15 is a functional block diagram illustrating an example of the hardware configuration of the information processing apparatus included in the system according to an embodiment of the present disclosure.

An information processing apparatus 900 included in an imaging system according to the present embodiment primarily includes a CPU 901, a ROM 902, and a RAM 903. Also, the information processing apparatus 900 further includes a host bus 907, a bridge 909, an external bus 911, an interface 913, an input apparatus 915, an output apparatus 917, a storage apparatus 919, a drive 921, a connection port 923, and a communication apparatus 925.

The CPU 901 functions as an arithmetic processing apparatus and a control apparatus and controls the overall or partial operation in the information processing apparatus 900 according to various programs recorded in the ROM 902, the RAM 903, the storage apparatus 919, or a removable recording medium 927. The ROM 902 stores the programs and arithmetic parameters used by the CPU 901. The RAM 903 temporarily stores the programs used by the CPU 901, parameters that change as appropriate during execution of the programs, and the like. These are connected to each other by the host bus 907 that includes internal buses such as CPU buses. It should be noted that each of the constituents (i.e., the communication control section 2013, the estimation section 2015, and the output control section 2017) of the control section 2005 described earlier with reference to FIG. 2 can be realized, for example, by the CPU 901.

The host bus 907 is connected to the external bus 911 such as a PCI (Peripheral Component Interconnect/Interface) bus via the bridge 909. Also, the input apparatus 915, the output apparatus 917, the storage apparatus 919, the drive 921, the connection port 923, and the communication apparatus 925 are connected to the external bus 911 via the interface 913.

The input apparatus 915 is manipulating means, such as a mouse, a keyboard, a touch panel, a button, a switch, a lever, and a pedal, manipulated by the user. Also, the input apparatus 915 may be, for example, remote control means (what is called a remote control) using infrared rays or other radio waves or external connection equipment 929 such as a mobile phone or a PDA corresponding to the manipulation of the information processing apparatus 900. Further, the input apparatus 915 includes, for example, an input control circuit that generates an input signal on the basis of information input by the user by using the above manipulating means and outputs the signal to the CPU 901. The user of the information processing apparatus 900 can input various pieces of data to the information processing apparatus 900 and instruct that processing an operation be conducted by manipulating the input apparatus 915.

The output apparatus 917 includes apparatuses that are able to visually or audibly inform the user of acquired information. Such apparatuses are display apparatuses such as a CRT display apparatus, a liquid crystal display apparatus, a plasma display apparatus, an EL display apparatus, and lamps, audio output apparatuses such as a speaker and a headphone, and printer apparatuses. The output apparatus 917 outputs the result acquired by various processing tasks conducted by the information processing apparatus 900. Specifically, the display apparatus displays the result acquired by various processing tasks conducted by the information processing apparatus 900 in the form of a text or an image. Meanwhile, the audio output apparatus converts an audio signal including reproduced sound data, acoustic data, or the like into an analog signal and outputs the analog signal. It should be noted that the output section 2009 described earlier with reference to FIG. 2 can be realized, for example, by the output apparatus 917.

The storage apparatus 919 is an apparatus for storing data configured as an example of the storage section of the information processing apparatus 900. The storage apparatus 919 includes, for example, a magnetic storage device such as an HDD (Hard Disk Drive), a semiconductor storage device, an optical storage device, a magneto-optical storage section device, or the like. The storage apparatus 919 stores the programs executed by the CPU 901, various types of data, and the like. It should be noted that the storage section 2007 described earlier with reference to FIG. 2 can be realized, for example, by the storage apparatus 919.

The drive 921 is a reader/writer for a recording medium and incorporated in or attached externally to the information processing apparatus 900. The drive 921 reads out information recorded in the attached removable recording medium 927 such as a magnetic disk, an optical disc, a magneto-optical disk, or a semiconductor memory and outputs the information to the RAM 903. Also, the drive 921 can write a record to the attached removable recording medium 927 such as a magnetic disk, an optical disc, a magneto-optical disk, or a semiconductor memory. The removable recording medium 927 is, for example, DVD media, HD-DVD media, Blu-ray (registered trademark) media, or the like. Also, the removable recording medium 927 may be a CompactFlash (CF) (registered trademark), a flash memory, an SD memory card (Secure Digital memory card), or the like. Also, the removable recording medium 927 may be an IC card (Integrated Circuit card) having a non-contact IC chip, electronic equipment, or the like.

The connection port 923 is a port for direct connection to the information processing apparatus 900. Examples of the connection port 923 are USB (Universal Serial Bus) port, IEEE1394 port, and SCSI (Small Computer System Interface) port. Other examples of the connection port 923 are an RS-232C port, an optical audio terminal, and an HDMI (registered trademark) (High-Definition Multimedia Interface) port. The information processing apparatus 900 can directly acquire various pieces of data from the external connection equipment 929 or provide various types of data to the external connection equipment 929 by connecting the external connection equipment 929 to the connection port 923.

The communication apparatus 925 is a communication interface that includes a communication device for connection to a communication network 931, for example. The communication apparatus 925 is, for example, a communication card for a wired or wireless LAN (Local Area Network), Bluetooth (registered trademark), a WUSB (Wireless USB), or the like. Also, the communication apparatus 925 may be a router for optical communication, a router for an ADSL (Asymmetric Digital Subscriber Line), a modem for various types of communication, or the like. This communication apparatus 925 can transmit and receive a signal and the like to and from the Internet or another communication equipment in conformity with a predetermined protocol such as a TCP/IP. Also, the communication network 931 connected to the communication apparatus 925 includes a network connected in a wired or wireless manner or the like and may be, for example, the Internet, a home LAN, infrared communication, radio wave communication, satellite communication, or the like. It should be noted that the wireless communication section 2003 described earlier with reference to FIG. 2 can be realized, for example, by the communication apparatus 925.

An example of the hardware configuration that can realize the functions of the information processing apparatus 900 included in the imaging system according to the embodiment of the present disclosure has been described above. Each of the above constituents may be configured by using a general-purpose member or include hardware tailored to the functions of the constituent. Accordingly, it is possible to change the hardware configuration to be used as appropriate according to a technical level at the time when the present embodiment is carried out. It should be noted that, although not illustrated in FIG. 15, various constituents corresponding to the information processing apparatus 900 included in the imaging system according to the present embodiment are naturally provided.

It should be noted that it is possible to create computer programs for realizing the respective functions of the information processing apparatus 900 included in the imaging system according to the present embodiment as described above and implement the programs in a personal computer or the like. Also, it is possible to provide a computer-readable recording medium having such computer programs stored therein. The recording medium is, for example, a magnetic disk, an optical disc, a magneto-optical disk, a flash memory, or the like. Also, the above computer programs may be delivered, for example, via the network without using the recording medium. The number of computers for executing the computer programs in question is not particularly limited. For example, the computer programs in question may be executed in coordination between the plurality of computers (e.g., plurality of servers). It should be noted that a single computer or a plurality of computers working in a coordinated manner will be also referred to as a "computer system."

5. Conclusion

As described above, in the system according to the embodiment of the present disclosure, the communication apparatus (terminal apparatus 200) includes the one or more communication sections, the estimation section, and the output control section. Each of the communication sections communicates with other communication apparatuses via the wireless communication channel. The estimation section estimates, on the basis of the reception result of the wireless signal by at least some of the one or more communication sections, the incoming direction of the wireless signal. The output control section exercises control in such a manner that the notification information according to the estimation result of the incoming direction is presented via the output section. The configuration as described above makes it possible to present the wireless signal, which is difficult for the user to directly view, to the user in an identifiable manner. That is, according to the communication apparatus according to the present embodiment, even in the situation where the wireless signals such as millimeter waves that have the extremely high straight traveling property and can decline significantly in radio wave strength as a result of being shielded by a shield is used for communication, it is possible to feed back, to the user, the presence of the wireless signal in question in a more preferred manner.

Although the preferred embodiment of the present disclosure has been described in detail above with reference to the attached drawings, a technical scope of the present disclosure is not limited to such an example. It is apparent that a person having ordinary knowledge in the technical field of the present disclosure can conceive of various examples of changes or modifications within a category under which the basic technical philosophy described in the claims falls and that these are also naturally construed as belonging to the technical scope of the present disclosure.

For example, although, in the embodiment described above, the case was primarily described where the plurality of communication sections (antenna apparatuses 220) for receiving the wireless signal are provided, it is possible to estimate the incoming direction of the wireless signal and present, to the user, information according to the estimation result in question as long as at least one communication section is provided. As a specific example, in a case where one communication section is provided, it is also possible to estimate the incoming direction of the wireless signal when the communication section in question receives the wireless signal in question. That is, it is only necessary for the terminal apparatus 200 guide the user in such a manner as to change the posture of the housing 201 and estimate the incoming direction of the wireless signal when the communication section becomes able to receive the wireless signal on the basis of the detection result of the posture of the housing 201 at that time and the reception result of the wireless signal in question.

Also, an advantageous effect described in the present specification is explanatory or illustrative and not restrictive. That is, the technology according to the present disclosure can provide other advantageous effects apparent to a person skilled in the art from the description of the present specification together with or in place of the above advantageous effect.

It should be noted that the following configurations also belong to the technical scope of the present disclosure.

(1)
A communication apparatus including:
one or more communication sections each configured to communicate with other communication apparatuses via a wireless communication channel;
an estimation section configured to estimate, on the basis of reception results of a wireless signal by at least some of the one or more communication sections, an incoming direction of the wireless signal; and
an output control section configured to exercise control in such a manner that notification information according to an estimation result of the incoming direction is presented via an output section.

(2)
The communication apparatus of feature (1), in which the output control section exercises control in such a manner that information indicating the incoming direction is presented as the notification information.

(3)
The communication apparatus of feature (2), in which the output control section exercises control in such a manner that information indicating the incoming direction is presented in a manner superimposed on a real space.

(4)
The communication apparatus of any one of features (1) to (3) including:
a plurality of the communication sections; and
a housing configured to support the plurality of communication sections in such a manner that the plurality of communication sections receive, respectively, the wireless signals arriving from relatively different directions, in which
the estimation section estimates, on the basis of reception results of the wireless signal by at least some of the plurality of communication sections, the incoming direction of the wireless signal in question.

(5)
The communication apparatus of feature (4), in which the estimation section identifies, on the basis of the reception results of the wireless signal by at least some of the communication sections, the communication section of the at least some of the communication sections that has higher reception sensitivity, and
the output control section exercises control in such a manner that information according to the identification result of the communication section having the higher reception sensitivity is presented as the notification information.

(6)
The communication apparatus of feature (5), in which the output control section exercises control in such a manner that a position where the identified communication section having the higher reception sensitivity is supported is presented as the notification information.

(7)
The communication apparatus of feature (5) or (6), in which
the output control section exercises control in such a manner that information regarding guidance as to a method by which the housing is to be gripped according to the identification result of the communication section having the higher reception sensitivity is presented as the notification information.

(8)
The communication apparatus of feature (7), in which the output control section exercises control in such a manner that the position by which the housing is to be gripped is presented as information regarding the guidance as to the method by which the housing in question is to be gripped.

(9)
The communication apparatus of feature (7) or (8), in which
the output control section exercises control in such a manner that information regarding the guidance as to the method by which the housing is to be gripped according to a posture of the housing in question is presented.

(10)
The communication apparatus of any one of features (1) to (9), in which
the communication section is configured in such a manner as to be able to control a directional beam pattern related to the reception of the wireless signal, and
the estimation section estimates, on the basis of identification information associated with the directional beam used by the communication section for the reception of the wireless signal, the incoming direction of the wireless signal in question.

(11)
The communication apparatus of feature (10), in which the wireless signal is a downlink signal transmitted by a base station by selectively switching between a plurality of beam patterns.

(12)
An information processing apparatus including:
an estimation section configured to estimate, on the basis of reception results of a wireless signal by at least some of one or more communication sections each of which communicates with other communication apparatuses via a wireless communication channel, an incoming direction of the wireless signal in question; and
an output control section configured to exercise control in such a manner that notification information according to an estimation result of the incoming direction is presented via an output section.

(13)

An information processing method including, by a computer:
estimating, on the basis of reception results of a wireless signal by at least some of one or more communication sections each of which communicates with other communication apparatuses via a wireless communication channel, an incoming direction of the wireless signal in question; and exercising control in such a manner that notification information according to an estimation result of the incoming direction is presented via an output section.

REFERENCE SIGNS LIST

1: System
100: Base station
200: Terminal apparatus
201: Housing
220: Antenna apparatus
221: Substrate
223: Antenna component
225: Control circuit
2001: Antenna section
2003: Wireless communication section
2005: Control section
2007: Storage section
2009: Output section
2011: Detection section
2013: Communication control section
2015: Estimation section
2017: Output control section
2019: Display section

The invention claimed is:
1. An information processing method, comprising:
receiving, by an information processing apparatus, a wireless signal from at least one antenna;
estimating, by the information processing apparatus, an incoming direction of the wireless signal based on the wireless signal from the at least one antenna;
controlling, by the information processing apparatus, based on a result of the estimation of the incoming direction, a display screen to display notification information, wherein the notification information includes:
an image of the information processing apparatus, and
a position of the at least one antenna in the information processing apparatus as an icon on the image of the information processing apparatus; and
changing, by the information processing apparatus, a location of the notification information on the display screen based on a rotation of the information processing apparatus.
2. An information processing apparatus, comprising:
at least one processor configured to:
receive a wireless signal from at least one antenna;
estimate an incoming direction of the wireless signal based on the wireless signal from the at least one antenna;
control, based on a result of the estimation of the incoming direction, a display screen to display notification information, wherein the notification information includes:
an image of the information processing apparatus, and
a position of the at least one antenna in the information processing apparatus as an icon on the image of the information processing apparatus; and
change a location of the notification information on the display screen based on a rotation of the information processing apparatus.
3. A first communication apparatus, comprising:
at least one antenna configured to receive a wireless signal from a second communication apparatus via a wireless communication channel; and
at least one processor configured to:
estimate an incoming direction of the wireless signal based on the wireless signal received by the at least one antenna;
control, based on a result of the estimation of the incoming direction, a display screen to display notification information, wherein the notification information includes:
an image of the first communication apparatus, and
a position of the at least one antenna in the first communication apparatus as an icon on the image of the first communication apparatus; and
change a location of the notification information on the display screen based on a rotation of the first communication apparatus.
4. The first communication apparatus of claim 3, wherein the displayed notification information indicates the incoming direction of the wireless signal.
5. The first communication apparatus of claim 4, wherein the at least one processor is further configured to control the display screen to display the notification information indicating the incoming direction superimposed on a real space.
6. The first communication apparatus of claim 3, further comprising:
a plurality of antennas including the at least one antenna; and
a housing configured to support the plurality of antennas such that the plurality of antennas is configured to receive a plurality of wireless signals from different directions, wherein
the plurality of wireless signals includes the wireless signal, and
the at least one processor is further configured to estimate the incoming direction of the wireless signal based on the plurality of wireless signals received by the plurality of antennas.
7. The first communication apparatus of claim 6, wherein the at least one processor is further configured to:
identify, based on the plurality of wireless signals received by the plurality of antennas, a first antenna of the plurality of antennas that has a higher reception sensitivity than a second antenna of the plurality of antennas; and
control, based on the identified first antenna having the higher reception sensitivity, the display screen to display the notification information.
8. The first communication apparatus of claim 7, wherein the displayed notification information indicates a position in the housing where the identified first antenna having the higher reception sensitivity is supported.
9. The first communication apparatus of claim 7, wherein the at least one processor is further configured to control, based on the identified first antenna having the higher reception sensitivity, the display screen to display the notification information that includes guidance information regarding guidance to grip the housing.

10. The first communication apparatus of claim 9, wherein the guidance information indicates a position to grip the housing.

11. The first communication apparatus of claim 9, wherein the at least one processor is further configured to control, based on a posture of the housing, the display screen to display the guidance information.

12. The first communication apparatus of claim 3, wherein
- the at least one antenna is further configured to receive the wireless signal based on a directional beam, and
- the at least one processor is further configured to estimate the incoming direction of the wireless signal based on identification information associated with the directional beam used by the at least one antenna for the reception of the wireless signal.

13. The first communication apparatus of claim 12, wherein the wireless signal is a downlink signal transmitted by a base station by selectively switching between a plurality of beam patterns.

* * * * *